Jan. 7, 1930.  W. S. GUBELMANN  1,742,526
NUMBERING MECHANISM FOR CALCULATING AND LIKE MACHINES
Original Filed Jan. 10, 1900  8 Sheets-Sheet 1

INVENTOR
William S. Gubelmann

Jan. 7, 1930.  W. S. GUBELMANN  1,742,526
NUMBERING MECHANISM FOR CALCULATING AND LIKE MACHINES
Original Filed Jan. 10, 1900   8 Sheets-Sheet 2
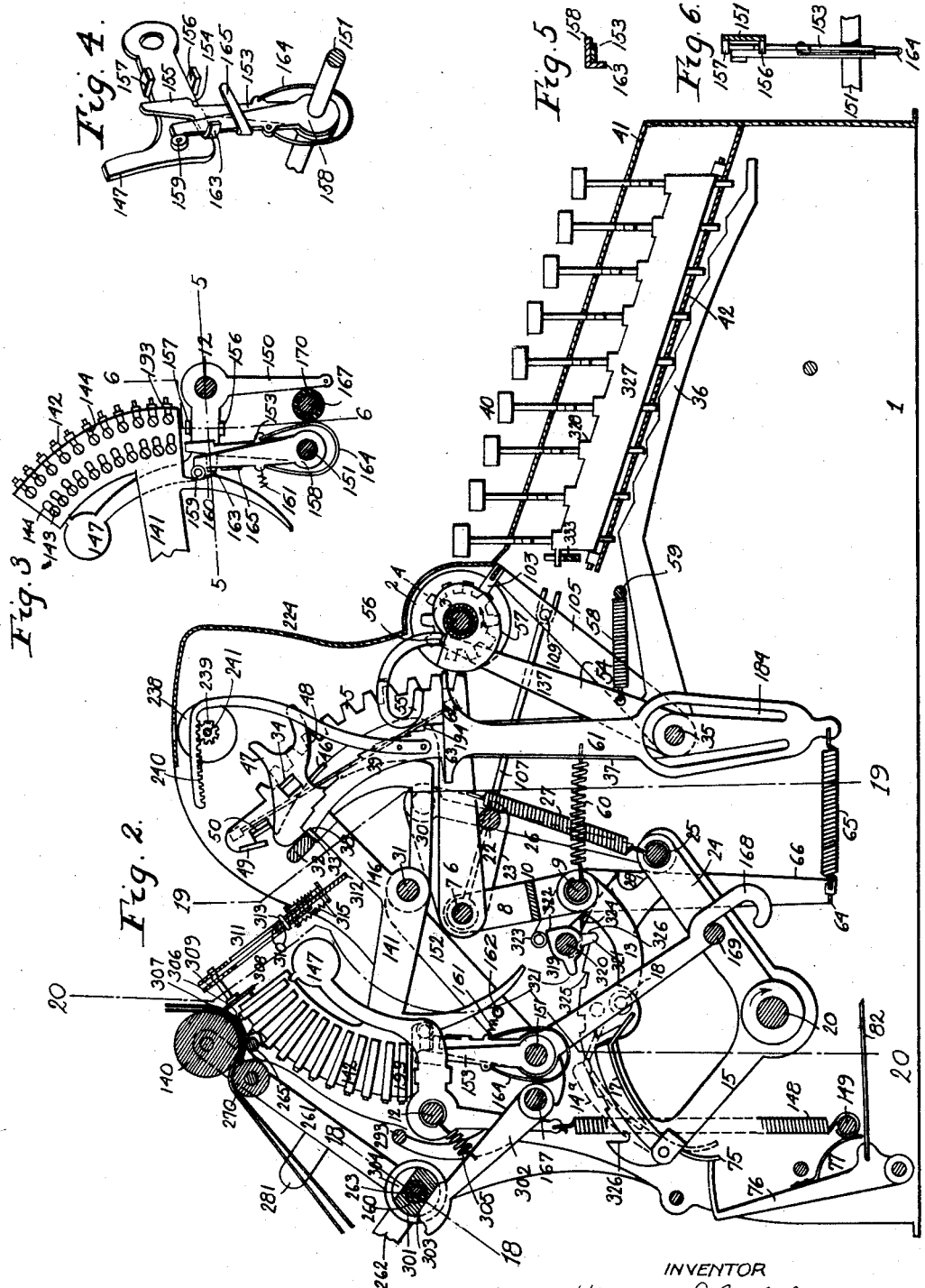
INVENTOR
William S. Gubelmann Jan. 7, 1930.　　　W. S. GUBELMANN　　　1,742,526
NUMBERING MECHANISM FOR CALCULATING AND LIKE MACHINES
Original Filed Jan. 10, 1900　　8 Sheets-Sheet 3
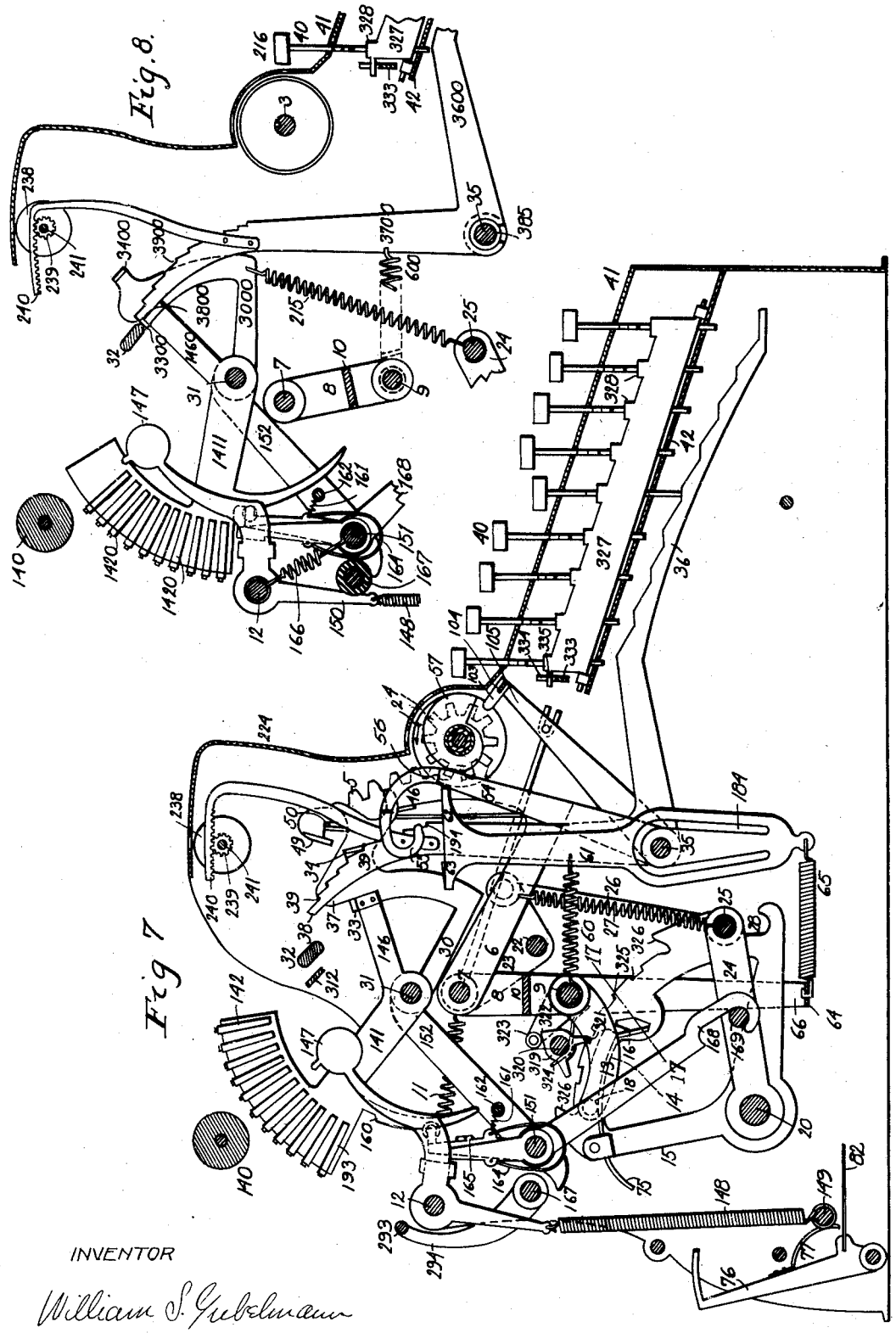
INVENTOR
William S. Gubelmann Jan. 7, 1930.  W. S. GUBELMANN  1,742,526
NUMBERING MECHANISM FOR CALCULATING AND LIKE MACHINES
Original Filed Jan. 10, 1900  8 Sheets-Sheet 4
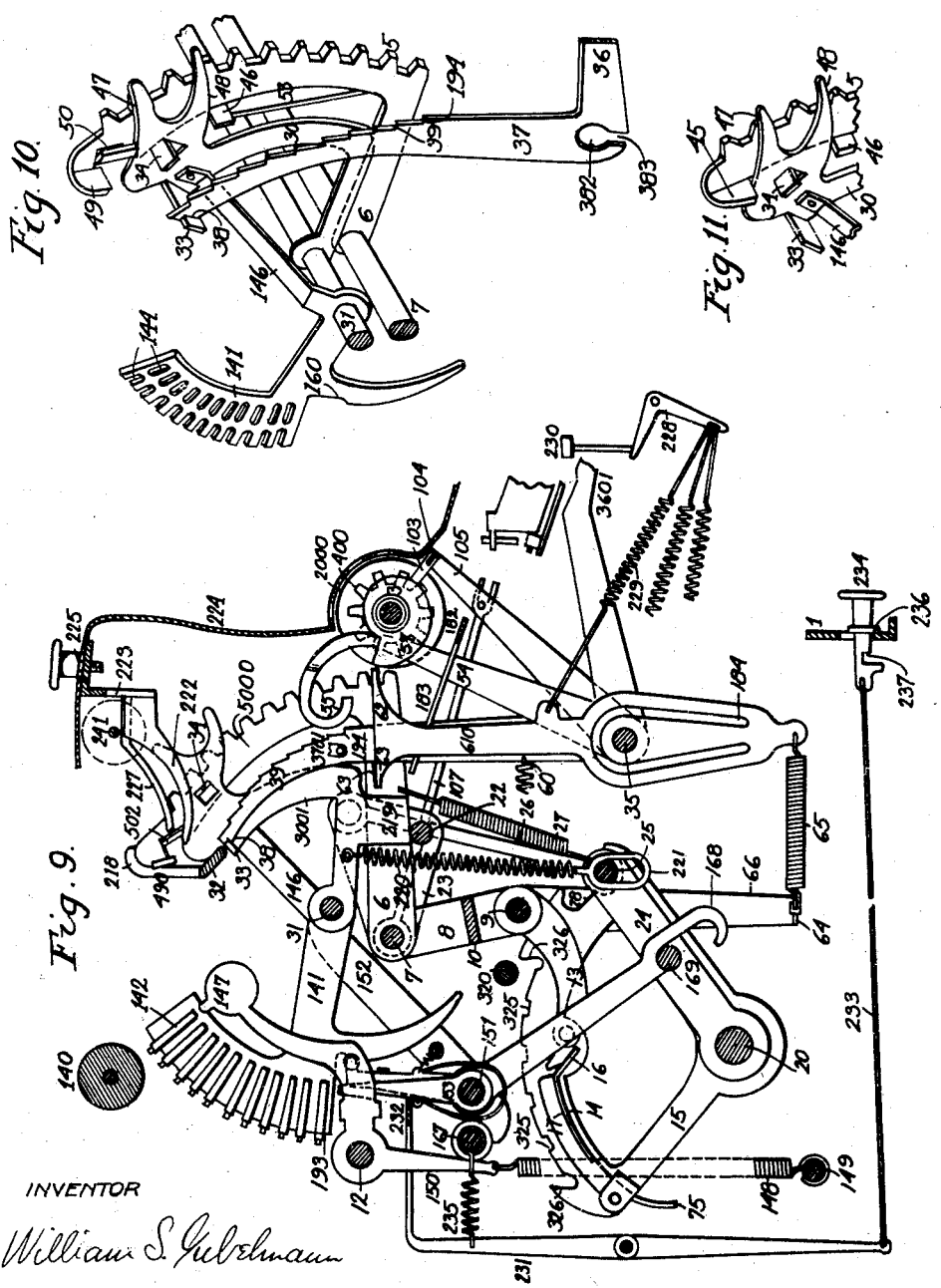
INVENTOR
William S. Gubelmann Jan. 7, 1930.　　　W. S. GUBELMANN　　　1,742,526
NUMBERING MECHANISM FOR CALCULATING AND LIKE MACHINES
Original Filed Jan. 10, 1900　8 Sheets-Sheet 5
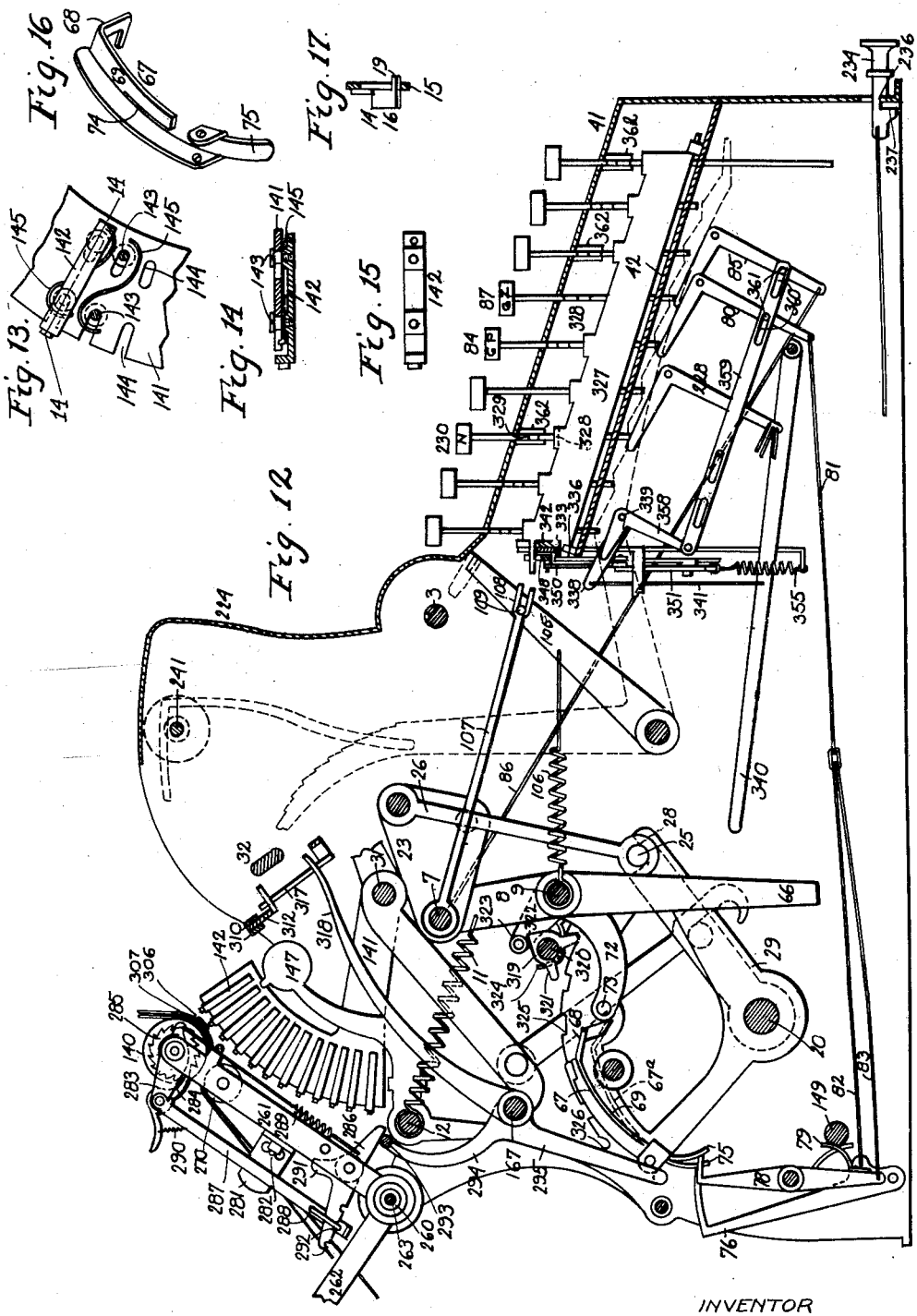
INVENTOR
William S. Gubelmann

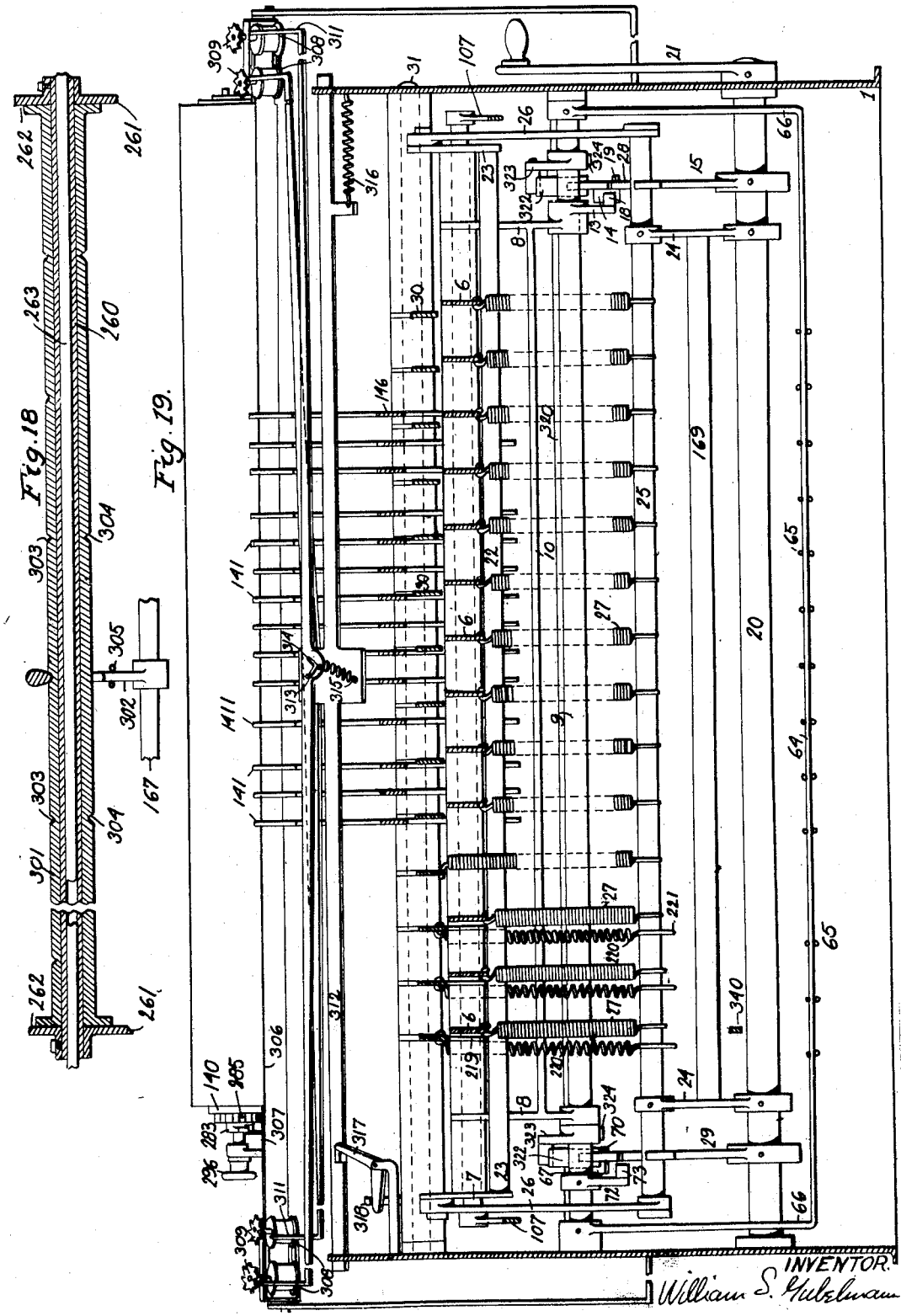

Jan. 7, 1930.   W. S. GUBELMANN   1,742,526
NUMBERING MECHANISM FOR CALCULATING AND LIKE MACHINES
Original Filed Jan. 10, 1900    8 Sheets-Sheet 7
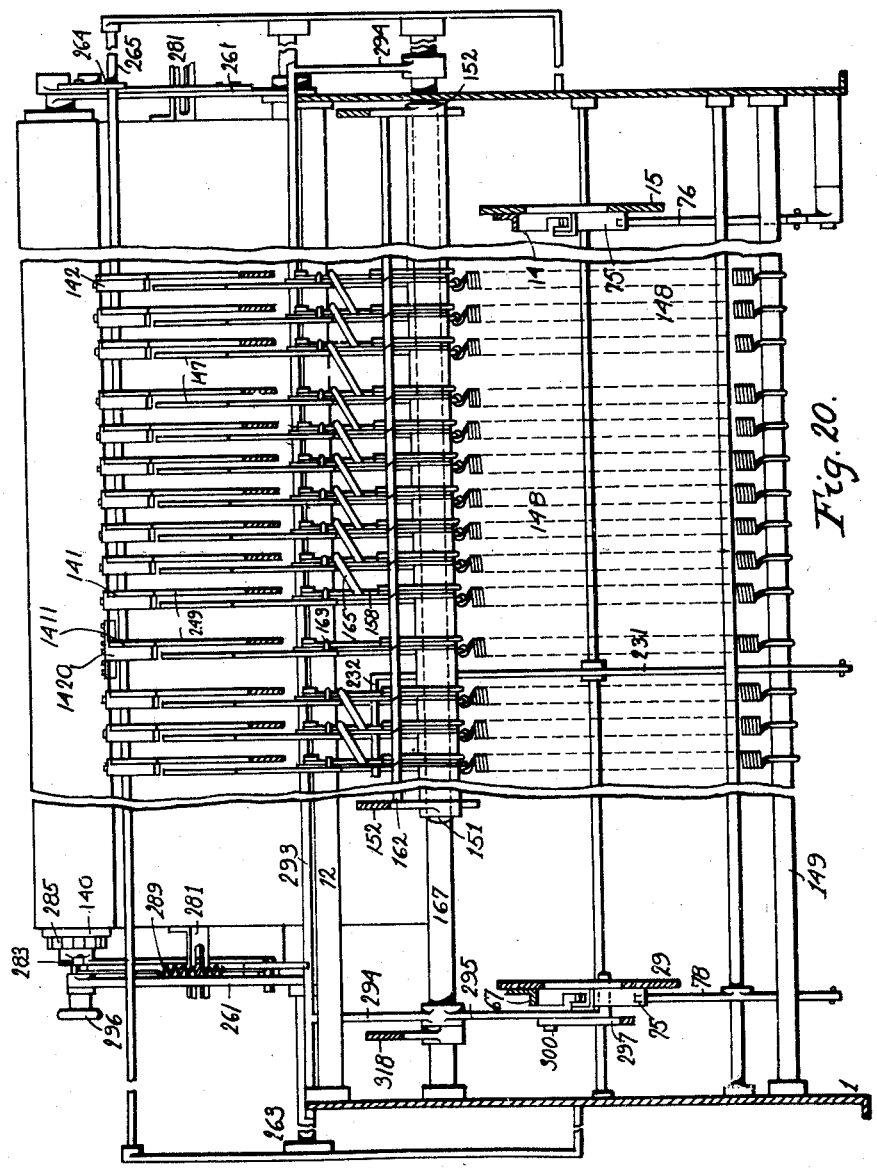
INVENTOR
William S. Gubelmann Jan. 7, 1930. W. S. GUBELMANN 1,742,526
NUMBERING MECHANISM FOR CALCULATING AND LIKE MACHINES
Original Filed Jan. 10, 1900 8 Sheets-Sheet 8
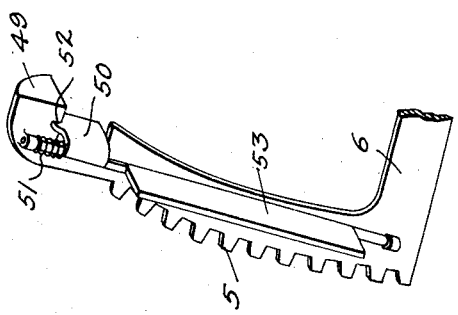
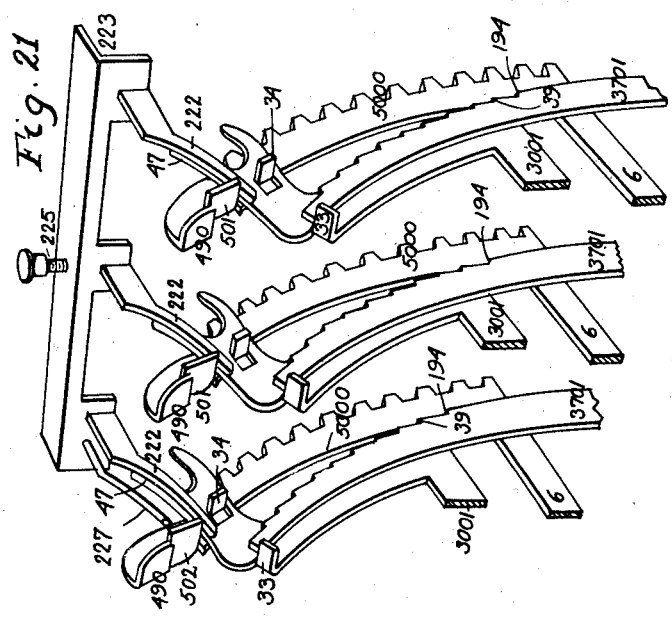
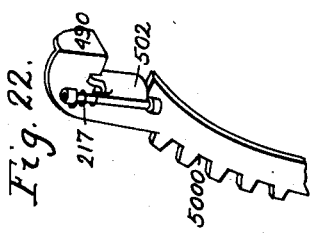
INVENTOR
William S. Gubelmann Patented Jan. 7, 1930

1,742,526

UNITED STATES PATENT OFFICE

WILLIAM S. GUBELMANN, OF BUFFALO, NEW YORK

NUMBERING MECHANISM FOR CALCULATING AND LIKE MACHINES

Original application filed January 10, 1900, Serial No. 1,004. Divided and this application filed October 9, 1918. Serial No. 257,465.

The invention relates to consecutive numbering mechanism for use with calculating and other recording machines, and one of the objects is to provide a mechanism whereby printing of numbers in consecutive order may be effected. This application is a division of my application No. 1,004, filed January 10, 1900, and eventuating in Patent No. 1,429,201, granted September 12, 1922.

Another object is to combine such mechanism with printing mechanism, so that items consecutively printed by said printing mechanism may be consecutively numbered.

Another object is to combine said numbering mechanism and said item printing mechanism with accumulating mechanism so that items accumulated on said accumulating mechanism may be printed by said item printing mechanism and numbered by said number printing mechanism.

Another object is to combine said numbering mechanism and item printing mechanism and said accumulating mechanism with an item counting mechanism which counts the number of items accumulated by said accumulating mechanism and printed by said item printing mechanism and also controls said numbering printing mechanism for determining the numbers to be printed thereby.

Another object is to so combine said mechanisms that when said item printing mechanism prints totals from said accumulating mechanism or prints items which are not entered on said accumulating mechanism, said counting mechanism will not count such operations and said numbering mechanism will not print the consecutive numbers of such operations.

Other objects will appear from the following description and claims.

I accomplish all of the above objects by mechanism which is illustrated in the accompanying drawings consisting of eight sheets and in which:

Fig. 2 is a vertical longitudinal section of the same, taken substantially in line 2—2, Fig. 1, and showing the adding or recording mechanism of one column or set of keys in the normal or inoperative position.

Fig. 3 is a fragmentary sectional elevation of the printing mechanism of one of the row of keys viewed from the side opposite to that shown in Fig. 2.

Fig. 4 is a fragmentary perspective view of the hammer operating mechanism.

Fig. 5 is a horizontal section in line 5—5, Figure 3.

Fig. 6 is a vertical section in line 6—6, Figure 3.

Fig. 7 is a view similar to Figure 2 with parts of the adding and recording mechanism in shifted or operating position.

Fig. 8 is a fragmentary longitudinal sectional elevation taken substantially in line 8—8, Figure 1, and showing the mechanism whereby words are printed.

Fig. 9 is a fragmentary longitudinal sectional elevation taken substantially in line 9—9, Figure 1, and showing the mechanism whereby the number of adding operations of the machine are separately counted and numbered.

Fig. 10 is a fragmentary perspective view showing the key lever, the main gear segment, the controlling arm and the printing segment of one of the higher columns of numbers.

Fig. 11 is a fragmentary perspective view of the lowest order controlling arm and gear segment.

Fig. 12, is a longitudinal sectional elevation, taken substantially in line 12—12, Figure 1, and showing particularly the paper carriage and the mechanism whereby different parts of the machine may be thrown into and out of gear.

Fig. 13 is a fragmentary sectional side elevation of one of the printing segments showing the means for mounting the type movably thereon.

Fig. 14 is a cross section of the type segment in line 14—14, Figure 13.

Fig. 15 is a side view of one of the type carriers viewed from the side opposite to that shown in Figure 13.

Fig. 16 is a perspective view showing one of a pair of substantially similar cams, one of which serves to shift the main dial operating segments into their operative position and the other one of which serves to shift the parts into position for printing a total of the added numbers.

Fig. 17 is a vertical section in line 17—17, Figure 7.

Fig. 18 is a fragmentary transverse section, taken in line 18—18, Figure 2, and showing the means for adjusting the paper carriage lengthwise of the line of printing.

Fig. 19 is a vertical section, taken substantially in line 19—19, Figure 2.

Fig. 20 is a vertical transverse section, taken substantially in line 20—20, Figure 2.

Fig. 21 is a fragmentary perspective view of the counting mechanism.

Fig. 22 is a fragmentary perspective view of the units gear segment of the counting mechanism.

Fig. 23 is a fragmentary perspective of one of the main registering gear segments and its associated trip mechanism.

Like reference characters refer to like parts in the several views.

*General construction*

Figure 1:
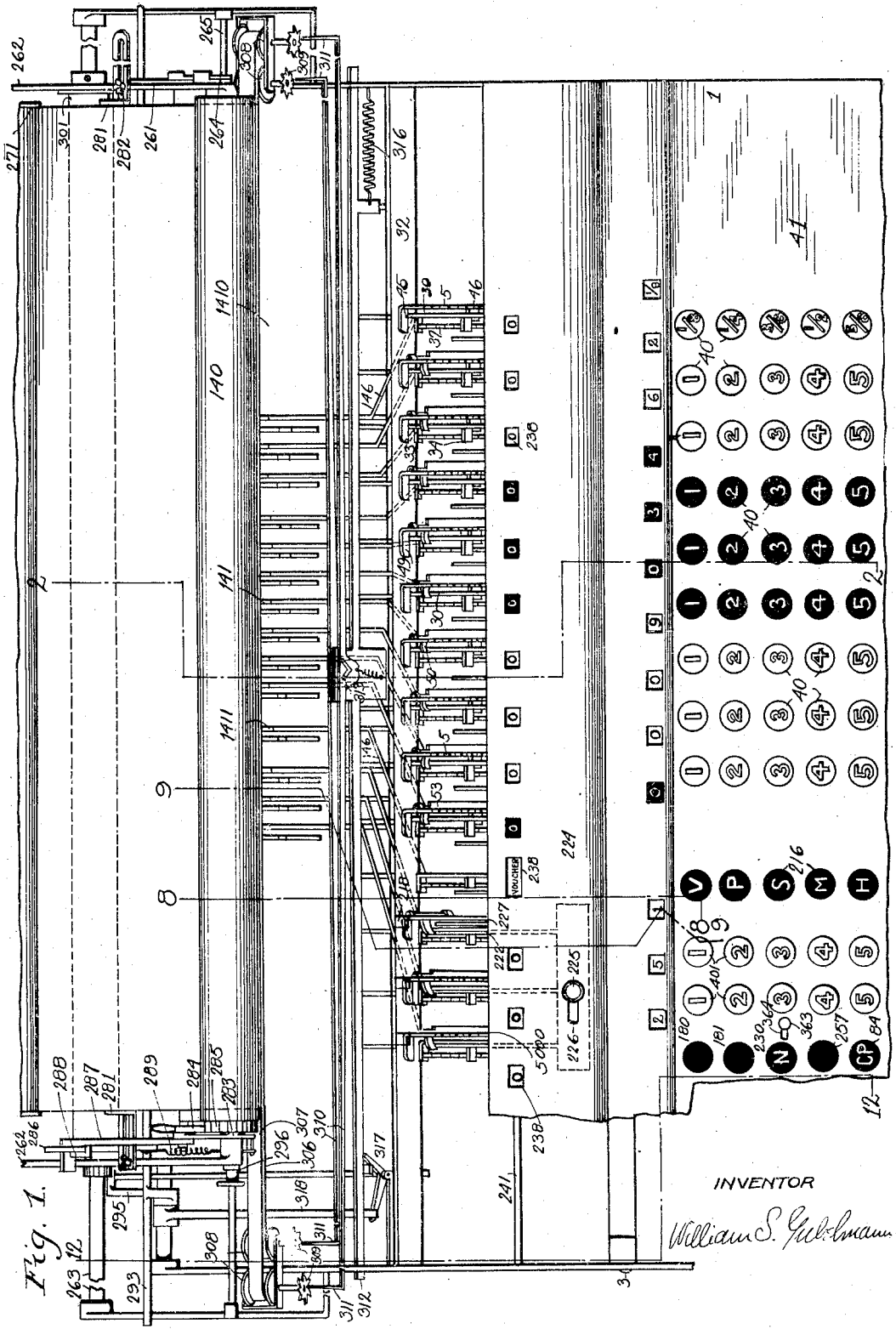
Fig. 1 is a fragmentary top plan view of my improved adding and recording machine.

1 represents the main frame of the machine which may be of any suitable construction so as to support the working parts of the machine.

2, Figures 2 and 7, represents a number of main dials which register the total of the numbers which are added together. These dials consist preferably of cup-shaped wheels which are numbered on their periphery and are mounted in their proper order on a transverse dial shaft 3, which is journaled in bearings on the main frame, the dials being so arranged that the dial representing the lowest number is arranged on the right hand end of the series and the dials representing the successively higher numbers being arranged successively in their order toward the left from the dial representing the lowest number. The lowest or right hand dial is preferably divided on its periphery into eighths so as to indicate fractions of a cent in eighths, and the remaining dials are graduated on their periphery according to the decimal system into tenths. As shown in the drawings ten total dials are shown and extend from fractions of a cent to tens of millions, but if desired, additional dials may be added to the right and to the left of the series, if it is desired to register smaller divisions of a cent or more than tens of millions. Each of the main total dials 2 is provided on its left hand side with a gear pinion 4, which is rigidly connected therewith, as shown in Figures 2 and 7. The pinion of the fraction wheel has eight teeth while the pinions of the remaining dials are each provided with ten teeth. 5 represents the main registering gear segments, one of which is provided for each of the dials 2 and is adapted to engage with the pinion thereof, for operating the respective dial. Each of these gear segmens is arranged in rear of its companion gear pinion and is provided at its lower end with a rearwardly projecting arm 6 which is pivoted loosely on a transverse supporting rod 7. This rod is mounted with its ends on the upper ends of two rock-arms 8 which turn loosely with their lower ends on a transverse rock shaft 9. The rock-arms 8 are to move back and forth together. In the normal position of the gear segments when the machine is at rest these segments are retracted rearwardly out of engagement with the dial pinions of the dials and the segments are elevated so that their lowermost teeth are opposite the spaces between the adjacent teeth of the dial pinions, these spaces being in line with the pivots of the pinions and the gear segments.

The gear segments are yieldingly held backwardly out of engagement with the dial pinions by means of springs 11 connecting the rock-arms 8 with a stationary part of the frame. Figure 12 shows one of the springs 11 connecting one of the rock-arms 8 with a transverse stationary bar 12 in the rear part of the machine. The gear segments are moved forwardly so that their teeth engage with the dial pinions 4 by means of a shifting rock-arm 13, which is preferably secured to the right hand rock-arm 8 and projects rearwardly. Upon raising the shifting rock-arm 13, the rock-arms 8 are swung forwardly and the gear segments 5 are engaged with the dial pinions, while upon swinging the shifting rock-arms downwardly, the rock-arms 8 are swung rearwardly and the gear segments are disengaged from the dial pinions.

14 represents a cam whereby the gear segments are engaged with the dial pinions. This cam is mounted on the upper portion of a vertically swinging rocking frame 15 which is arranged on the right-hand side of the machine. This cam is provided at its front end with a concentric face 17. When the cam is in its rearmost or retracted position, its incline stands in rear of a roller or projection 18 on the rear end of the shifting arm 13, as shown in Figures 2, 7, and 19. Upon swinging the rocking frame 15, so that the cam 14 moves forwardly, the incline of the latter engages underneath the roller 18 and raises the arm 13, thereby moving the arms 8 forwardly. The throw of the incline 16 is just sufficient to engage the teeth of the gear segments with the dial pinions. When the roller 18 has been raised to the top of the incline, the concentric portion of the cam engages with the roller during the continued forward movement of the cam and the latter does not shift the gear segments any further forward.

When the rear end of the concentric face 17 of the cam passes forwardly from underneath the roller 18, the constant pull of the springs 11 causes the rock-arm 13 to be depressed and the rock-arms 8 to be moved rearward, thereby disengaging the gear segments from the dial pinions. Upon now moving the cam 14 backwardly together with the rocking frame 15, this cam does not affect the arm 13 of the parts connected therewith but is affected by said arm at the last portion of the backward movement of the cam, at which time the back or lower side of incline 16 engages with the roller 18 which lifts said incline and at the end of the backward movement of the cam, the latter clears said roller and drops behind the same, as shown in Figure 2, preparatory to again raising the roller 18 and connecting parts during the next forward movement of the cam 14.

For the purpose of permitting the front end of the cam to rise so as to clear the roller 18, this cam is pivoted at its rear end to the rear portion of the rocking frame 15. The upward and downward movement of the front end of the cam is limited by means of a lug 19 projecting from the side of the cam and engaging with a slot in the adjacent part of the rocking frame 15, as shown in Figures 17 and 19. The rocking frame 15 is secured with its lower portion to a transverse rock-shaft 20 journaled in the main frame and provided outside of the frame with a hand crank 21, as shown in Figure 19, whereby the shaft is rocked and the parts connected therewith are operated.

The gear segments 5 are raised to their highest position by means of a return or lifting bar 22 which extends transversely underneath all of the arms 6 of the gear segments and which is connected loosely at its ends with the transverse rod 7 by lifting plates 23. 24 represents two shifting arms which are mounted loosely at their rear ends on the rock-shaft 20 and which support at their other ends a transverse bar 25 which transverse bar is connected at its ends by two links 26 with the lifting plates 23, whereby upon raising the shifting arms 24, the lifting bar 22 is caused to raise the gear segments and the other parts connected therewith resting on said bar. Upon depressing the transverse bar 25, the lifting bar 22 is moved downwardly and the gear segments resting thereon are permitted to move downwardly with the bar until the segments are arrested.

Each of the gear segments is yieldingly held in contact with the lifting bar 22 by a spring 27 which connects the arm of the segment with the transverse bar 25. If the downward movement of the gear segment is arrested while the shifting arms 24 continue to move downwardly, the lifting bar 22 is moved away from the underside of the arm of the gear segment and the spring 27 is strained. The transverse bar 25 is arranged at one end in the segmental notch 28 formed in the front part of the rocking frame 15, shown in Figures 2, 7, 9 and 19, and its opposite end is arranged in a similar segmental notch 28, formed in a rocking frame 29 which is secured to the operating shaft 20 on the left-hand side of the machine. The rocking frames 15 and 29 together with the operating shaft 20 constitute the main or universal operating frame of the machine. When the machine is at rest as shown in Figure 2, the transverse bar 25 engages with the front side of the notches 28 in the rocking frames 15 and 29. Upon turning the rocking shaft 20 forwardly, by means of its handle 21, in the direction of the arrow, Figure 2, the rocking frames are moved forwardly during the first part of the movement independently of the transverse bar 25. The latter remains at rest until the inclined front end 16 of the cam 14 has raised the arm 13 and moved the gear segments into engagement with the dial pinions, during which movement the rocking frames move idly the extent of their notches 28 along the ends of the bar 25 without disturbing the latter. After the gear segments have been engaged with the dial pinions, the continued forward movement of the rocking frames causes the rear ends of their notches 28 to engage with the bar 25 and depress the same, thereby causing the lifting bar 22 to be moved downwardly and strain the spring 27. This causes all of the gear segments which are free, to be moved downwardly and to continue their downward movement until they are arrested. During the downward movement of the gear segments, while they are in engagement with the dial pinions, the latter and the dials connected therewith are turned in the direction of the arrow, Figure 7, until the downward movement of the segments is arrested. The extent which each dial is turned depends upon the position in which the downward movement of its operating segment is arrested. After the segments have been arrested in their downward movement, they remain in this position while the rocking frames complete their forward movement. At the end of the forward movement of the rocking frames, the roller 18 of the rock arm 13 drops off from the rear end of the concentric part of the cam 14, thereby allowing the springs 11 to pull the gear segments rearwardly out of engagement with the dial pinions.

Upon now turning the rock-shaft 20 backwardly by means of the handle 21, the rocking frames are moved backwardly until the front ends of the notches engage with bar 25. When the latter is so engaged it is moved backwardly with the rocking frames to the end of their rearward movement, which causes the transverse bar 25 to lift the lifting bar 22, and the gear segments which have been depressed, into their highest or normal position. During this upward movement of the depressed gear segments they are out of engagement with the dial pinions, so that the dials are not turned backwardly with the segments, but remain in their shifted positions. 30 represents a number of elbow-shaped controlling arms, which form part of the devices whereby the downward movement of the registering gear segments is controlled. One of these arms is arranged along the left-hand side of each gear segment and consists of an upright front part and a horizontal lower part which extends rearwardly from the lower end of the upright part, thereby leaving a clear space in rear of the upright part of the controlling lever, as represented in Figures 1, 2, 7, and 10. The rear end of the lower part of each controlling arm is mounted loosely on a transverse supporting bar 31, while the upper end of its front or upright part is loosely connected with the upper portion of its companion gear segment. This loose connection permits the controlling arm and the gear segment to swing freely about their individual axes, which are arranged parallel but out of line, and also permits the gear segment to move forward and backward into and out of engagement with its companion dial pinion. In the uppermost position of the controlling arms the same bear with their upper ends against a transverse stop bar 32, as shown in Figure 2, which limits the upward movement of these arms. Each controlling arm is provided on the rear part of its upper end with a locking lug 33, and on the front part of its upper end with a stop lug 34, both of which lugs project toward the left and are preferably stamped out of one piece with the controlling arm.

The operation of the registering devices is controlled by a number of elbow-shaped key levers which are arranged side by side and pivoted to a transverse supporting rod 35. Each key lever is provided with a lower actuating arm 36, which projects forwardly, and an upper stop arm 37 which projects upwardly along the left hand side of one of the controlling arms and gear segments, as represented in Figures 2, 7, and 10. Each of these key levers is provided on the rear side of its stop arm with a locking shoulder 38 which is adapted to engage with the locking lug 33 of the controlling arm when the latter is elevated into its highest position and the key lever is in its fully retracted position, as shown in Fig. 2. The key lever, when the parts are in this position, holds the controlling arm against downward movement and the latter holds the gear segment against downward movement. If the gear segment while so held against downward movement is moved forward into engagement with the adjacent dial pinion and the rocking frames are turned forwardly for depressing the gear segment, the spring 27 of this segment will be strained without, however, shifting the segment. At the end of this forward movement of the rocking segments, the roller 18 of the rock arm 13 drops off from the rear end of the cam 14, the gear segment is moved rearwardly out of engagement from the dial pinion and then the rocking frames move backwardly without having shifted the dial.

The upper arm of each key lever is provided on its front side with a vertical series of differential stop shoulders 39, which are arranged step fashion and extend from the upper end of this arm downwardly and forwardly thereon, or in other words the stop shoulders 39 are arranged radially out of line with one another and different distances from the pivot of the key lever. These stop shoulders of the key lever are adapted to be moved forwardly into the path of the stop lug 34 on the controlling arm. The stop shoulders are arranged different distances from the stop lug 34 of the controlling arm, so that by moving different stop shoulders of the key lever into the path of the stop lug of the controlling arm, the latter and the gear segment connected therewith may be arrested at different points in the downward movement. The uppermost stop shoulder of the key lever is most remote from the top lug of the controlling arm and therefore requires the greatest forward movement of the key lever in order to bring this stop shoulder into the path of this stop lug.

The stop shoulders of the key lever are so arranged that the distance from the stop shoulders to the path of the stop lug gradually grows less from the uppermost stop shoulder to the lowermost stop shoulder. The relative positions of the different stop shoulders of the key lever is such that when the locking shoulder 38 remains in engagement with the locking lug 33 and the gear segment is simply moved into and out of engagement with its dial pinion, the latter remains at zero, if the same has not been previously moved. But when the key lever has been moved forwardly, so as to disengage its locking shoulder from the locking lug and moves one of its stop shoulders into the path of the stop lug of the controlling arm, the latter arm and gear segment connected therewith will be moved downwardly upon moving the rocking frames forwardly, until the stop lug of the controlling arm strikes the respective stop shoulder of the key lever which stands in its path, as represented in Figure 7, whereby the gear segment while turning in engagement with the adjacent dial gear pinion turns the same forward. By turning the key lever forward more or less and moving one or the other of its stop shoulders into the path of the stop lug 34 of the controlling arm, the distance which this arm descends can be varied, thereby varying the number of spaces which its gear segment turns the adjacent dial.

Main number key mechanism 40 represents the main keys whereby the key levers of the main registering and recording mechanism are operated, and which are guided with their depending stems in the top 41 and bottom 42 of the key-board. As shown in the drawings, nine longitudinal columns of these keys are arranged transversely side by side. The first column on the right-hand side of the machine contains seven keys and represents fractions of one-eighth of a cent, the next column toward the left contains nine keys and represents cents and the remaining columns of keys toward the left each contains nine keys and represents progressively higher orders of numbers according to the decimal system, so that the registering keys in the last or left hand column represent hundreds of thousands of dollars.

The lowest numbers of the several columns of keys are arranged transversely in a row on the rear part of the key-board and the corresponding higher numbers of the several columns are arranged likewise in transverse rows and progressively in their order toward the front end of the key-board.

Each of the registering keys is yieldingly held in an elevated position by a spring, not shown since it forms no part of the invention claimed in this application. The upward movement of each key is limited by a shoulder formed on the upper part of its stem and engaging with the underside of the top of the key-board.

The downward movement of all of the keys is substantially the same, but the arrangement of each column of keys lengthwise of the lower actuating arm of each key lever causes the keys to bear against their lever at different distances from its pivot, so that by depressing different keys the same distance, the key lever will be turned different distances. The keys having the lowest numbers bear against their respective key levers nearest the pivot and consequently the levers are thereby thrown the greatest distance, and the uppermost stop shoulders are shifted into the path of the stop lug 34 of the respective controlling arms. The throw of each key lever upon depressing any one of its keys is so adjusted that the proper stop shoulder on its upper arm is moved into the path of the stop lug 34 of the controlling arm, and the downward movement of the respective gear segment is arrested after having turned the adjacent dial gear pinion a number of spaces corresponding to the number of the key which is depressed.

Loose connection for segments

The loose connection between each controlling arm and its gear segment, heretofore, referred to, is shown in its simplest form in the connection between the controlling arm and the gear segment, which are controlled by the initial or lowest column of registering keys. As shown in Figures 1 and 11, the loose connection between the controlling arm and the gear segment of the lowest registering device consists of upper and lower guide lugs 45 and 46 arranged on the upper end of the segment and bearing against the upper and lower guide faces 47 and 48, which are formed on the upper end of its companion controlling arm. As the controlling arm and segment rise and fall, the guide lugs of the segment slide back and forth on the guide faces of the arm. The guide faces are so constructed that the back and forth movement of the segment on the farm is radial with reference to the dial pinion in all positions of the segment. By so forming the guide faces of the arm, the gear segment can be engaged with and disengaged from the dial pinion in all positions of the segment without disturbing the position of the dial pinion. The construction of the loose connections between the controlling arms and gear segments of all of the higher registering devices above the fractional registering device are combined with carrying devices, whereby each registering dial, upon making one complete turn, causes the next higher dial to be turned forward one space, thereby carrying up a number from one column to the next higher column. The loose connections between the controlling arms and the segments and the carrying mechanism of the higher registering devices are constructed as follows:

As shown in Figures 1, 2, 7 and 10, each controlling arm is provided at its upper end with upper and lower guide faces 47 and 48 and its lower guide face is engaged by a lower guide lug 46 on the adjacent gear segment, the same as in the coupling between the controlling arm and segment of the initial registering device. The gear segments of the higher registering devices are each provided with an upper guide lug 49 which is adapted at times to bear against the upper guide face 47 of the companion controlling arm in substantially the same manner in which the upper guide lug 45 of the fractional gear segment bears against its companion arm, the only difference being that the upper guide lugs 49 of the higher gear segments are held out of engagement and separated by a space from the upper guide face of the companion arm when no number is carried from a lower to a higher registering device. The upper guide lug 49 is held in this elevated position above the adjacent guide face by a rocking latch 50 which is arranged in a notch in the rear side of the gear segment and which normally projects toward the left and engages with the upper guide face 47 of the adjacent controlling arm, as shown in Figures 2 and 10.

During the ordinary up and down movement of each higher controlling arm and gear segment, the latter is guided by its lower guide lug 46 and the locking latch 50 engaging with the lower and upper faces of the adjacent arm, this movement being the same as the movement of the controlling arm and gear segment of the fractional registering device. Normally the downward movement of the controlling arm is determined by the position of its companion key lever and this arm in turn controls the extent of the downward movement of the gear segment. When, however, the locking finger 50 is withdrawn out of engagement from the upper guide face 47 of the arm, the companion gear segment is capable of moving downward independently of the arm until the upper guide lug 49 engages with the upper guide face of the arm. The extent of this independent movement of the gear segment with reference to its companion arm is equal to one tooth or space of the segment, so that by this means the gear segment is enabled to turn the dial pinion one space more than the position of the key lever permits the same to move.

The withdrawal of the locking latch of each higher registering device is controlled by the next lower registering device and the withdrawal of each latch is effected when the next lower registering device has made one complete turn and arrived at zero. Each of the locking latches is pivoted on the right hand side of its adjacent gear segment, so as to turn transversely with reference to the latter. The latch is turned toward the left into its operative position by a spring 51, the movement in this direction being limited by a shoulder arranged on the latch and bearing against the right hand side of the gear segment. 53 is an upright trip plate connected with the lower end of each latch and arranged normally at right angles or nearly so to the adjacent gear segment, when the latch is in its operating position. 54 represents a number of upright trip arms, each of which is controlled by a lower registering device and which turns the locking latch of the next higher registering device into an inoperative position. This arm is mounted loosely with its lower end on the supporting bar 35 and is provided at its upper end with a rearwardly and then forwardly projecting hook 55, and in front and below said hook with an offset shoulder forming a bearing finger 56. 57 represents trip cams arranged on the left hand side of each registering dial pinion and connected with the adjacent pinion and dial, but separated from the pinion by an intervening space or groove. The face of each of these cams may begin at its lowermost point near the axis thereof and then extend outwardly in a spiral line terminating with its highest point in line with its lowermost point with which it connects abruptly. The trip cam of the fractional registering device has its face divided into eight parts, each part of which except the first is arranged one-eighth of a space further from the center of the cam than the preceding part, while the trip cams of the higher registering devices each has its face divided into ten parts, each part except the first being arranged one-tenth of a space farther from the axis of the cam than the preceding part. Each of the trip arms 54 extends upwardly along the right hand side of the trip cam of a lower registering device and its shoulder 56 engages with the face of this cam, while the hook 55 at its upper end extends toward the left and is adapted to engage with the trip plate 53 of the next higher registering mechanism. In the initial position of each trip arm, its shoulder 56 engages with the lowest part of its trip cam, as represented in Figure 2. As the trip cam is turned in the direction of the arrow, Figure 2, at the same time that its dial and gear pinion are moved forwardly by the adjacent gear segment during the adding operation, the trip arm is moved backwardly by the gradually rising face of the trip cam. During this backward movement of the trip arm, its hook engages with the trip plate 53 of the next higher registering device and is deflected toward the right thereby, the hook being sufficiently elastic for this purpose. After the hook has passed in rear of said trip plate, the hook owing to its resilience springs back to its normal position, so as to stand behind said trip plate. When the shoulder of the trip arm reaches the highest part of the face on the trip cam the trip arm has been shifted to its rearmost position. Upon now turning this cam forwardly another space together with its companion dial and pinion, the highest part of the cam is carried from underneath the shoulder of the trip arm and the latter is moved forwardly over the abrupt face of the cam until its shoulder 56 again engages with the lowest part of the cam face. During this movement of the trip arm, its hook strikes the rear side of the trip plate 53 of the next higher registering mechanism and turns the same forwardly thereby disengaging the locking latch from the adjacent controlling arm and permitting the gear segment carrying the trip plate to move forward one space. The forward movement of the trip arm is effected when the dial with which its trip cam is connected has made one complete rotation and again stands at zero, whereby the addition represented by this complete rotation is carried to the next higher registering device. The forward movement of the trip arm is effected quickly by a spring 58, which connects with a stationary cross bar 59 arranged in front of the trip arms. The trip plate 53 of each registering device is so arranged and is of such length that the hook of the next lower trip arm can engage with the rear side of the plate, for disengaging its latch in any position of the gear segment carrying the plate, and in order to accomplish this engagement it is obvious that cams 57 should be constructed so as to give arms 56 the proper throw. If a gear segment is locked in its highest position by reason of none of its companion keys having been depressed, the withdrawal of its latch from the controlling arm simply permits the gear segment to drop one space and turn its companion dial pinion forward one space, while in engagement therewith, the movement of this dial representing one number carried up from the next lower dial. If any one of the keys of the key levers has been depressed, so as to release the gear segment and permit the same to move downwardly for effecting an addition, and if during this time the next lower registering device has made a complete turn, so as to require the carrying up of a number from the next lower registering mechanism, the latch of the higher registering device will be withdrawn while the same is effecting its addition, thereby causing the segment to descend and turn its dial one space in addition to the space corresponding to the depression of its respective key.

When the locking latch has been withdrawn so as to permit a gear segment to move downwardly one space farther than its controlling arm, the latch remains in this position during the subsequent upward movement of the arm and the segment until the upward movement of the arm is arrested by striking the stop bar 32 and the gear segment continues its upward movement independently of the arm the extent of one space. The gear segment has now reached its highest position and its latch is again swung automatically by its spring over the controlling arm. The controlling arm and gear segment now remain in this relative position until another number is to be carried up from the next lower registering device.

When the controlling arm has been retracted to its highest position, the adjacent key lever is moved into its normal retracted position, so that its locking shoulder 38 engages with the locking lug 33 of the controlling arm and locks the latter against downward movement. The return movement of each key lever is preferably effected by a spring 60 which connects the upper arm of the key lever with the transverse shaft 9, as shown in Figures 2 and 7, or with some other convenient part of the machine. The lower guide lug of the gear segment is not absolutely necessary because the weight of the parts connected with the controlling arm and arranged in rear of its pivot is sufficient to raise the arm, but it is preferable to employ the lower guide lug 46 on the gear segment because it compels the arm to rise with the gear segment and avoids displacement of these parts with reference to each other, and also serves as a stop to limit the upward movement of the gear segment.

The gear pinion and the co-operating gear segment of the fractional registering device are so constructed that the fractional dial makes one rotation whenever it is moved forward eight spaces. After the fractional dial has made one rotation the whole number represented by this rotation is transferred by the first carrying device from the registering mechanism of the fractional dials to the next higher registering device which represents cents. The complete turns of each of the following registering devices are in like manner carried or transferred to the next higher dial by the respective carrying device. The dial which records the highest number, in this instance the millions of dollars, is preferably operated only by the adjacent carrying device of the next lower dial and is incapable of being operated directly from the key-board because it is not provided with a key operated mechanism.

The mechanism whereby the dials are all turned back to zero or the place of beginning after the adding of numbers has been completed is constructed as follows:

61 represents a series of feeling rock levers which are adapted to shift the key levers, so as to permit the gear segments to descend the proper distance for resetting or restoring the main registering dials to zero. One of these shifting levers is mounted loosely on the supporting bar 35 adjacent to the left hand side of each of the key levers and is provided on its upper arm with a forwardly projecting feeling finger 62 and with a laterally extending shifting finger 63 which extends behind the upper arm of the adjacent key lever. The finger 62 of each feeling lever is arranged in the rear of a total cam 57, and the shifting finger 63 lies in the rear of the associated key lever. 64 represents a transverse pull bar arranged in rear of the lower arms of the feeling levers and connected with each of the latter by a pull spring 65, as represented in Figures 2, 7 and 9. This pull bar is connected at its ends to the lower ends of two depending pull or rock arms 66, which are secured at their upper ends to the rock shaft 9, as shown in Figure 9. Upon turning this rock-shaft, so as to swing its depending pull arms backwardly the feeling levers are turned by means of the springs 65 so as to move the upper arms of these levers forwardly. This movement of the rock-shaft 9 is effected by a cam 67 (Figs. 12 and 19), mounted on the left-hand side of the rocking frame 29 and which is constructed substantially the same as the cam 14 which is mounted on the rocking frame 15. As shown in Figure 12, this cam is pivoted at its rear end by a transverse pin to the rear portion of the rocking frame 29 and is provided at its front end with an incline or cam face 68, and in rear of the incline with a concentric face 69. The cam 67 is pivotally supported on the rocking frame 29 in the same manner in which the like cam 14 is pivoted on its corresponding rocking frame 15. The cam 67 can be raised and lowered with its front end into an inoperative or operative position, this movement being limited by means of a lug 70 arranged on the cam as shown in Figure 19, and projecting into a slot 71 in the adjacent rocking frame in the same manner in which the movement of the cam 14 is limited, as shown in Figure 17.

72, Figs. 12 and 19, represents a rearwardly projecting rock-arm secured to the rock shaft 9 and provided at its rear end with a roller or projection 73 which is adapted to be engaged by the cam 67 for turning the rock shaft 9. When numbers are being added with the machine, the cam 14 is depressed, as shown in full lines, Figure 2, so as to be in a position when moved forwardly by the rocking frame 15 to engage the roller on the arm 13, for moving the gear segments into engagement with the dial pinions, and during this time the cam 67 is lifted into the position shown in full lines, Figure 12, so that when the rocking frame 29 is moved forwardly, the cam 67 will clear the roller 73 of the rock arm 72 and not disturb the rock-shaft 9 and the parts connected therewith.

If it is desired to restore all of the total dials 2 to zero, the cam 14 is raised into its inoperative position, shown by dotted lines 14 in Figure 2, and the cam 67 is lowered into its operative position, as shown by dotted lines 67ª in Figure 12. Upon now turning the rock-shaft 20 by hand so as to move both rocking frames 15 and 29 forwardly, the cam 14 passes over the roller 18 of the arm 13 without disturbing the same, but the inclined front of the cam 67 engages with the roller 73 on the rear end of the rock-arm 72 and raises the same until this roller engages with the concentric part 69 of this cam. By this movement of the arm 72, the rock shaft 9 is turned in the direction for moving its depending arms 66 rearwardly and pulling the springs 65 rearwardly. This pull on the springs 65 causes the feeling levers to be turned until the feeling fingers of the upper arms engage with the spiral surfaces of the trip cams. After the feeling fingers bear against the cams, their movement is arrested and the continued backward movement of the pull bar 64 simply stretches the springs 65 until the bar reaches the end of its backward movement. The feeling finger of each feeling lever engages with that part of the surface of the adjacent trip cam which is directly opposite the feeling finger, and as these trip cams are turned with the adjacent dial they present different parts of their spiral surfaces to the opposing feeling fingers, which causes the forward movement of the upper arms of the feeling levers to be arrested in different positions when swung forwardly. During the forward movement of the upper arm of each feeling lever, its shifting finger 63 engages with the rear side of the upwardly projecting arms of the adjacent key lever and moves this arm forwardly. The construction of the parts is such that the spiral surfaces of the trip cam bears a definite relation to the step-shaped series of stop shoulders on the upper arm of the key lever. When the feeling finger of the feeling lever, upon being moved forwardly, bears against the lowest key-lever-stop-controlling part of the adjacent trip cam, the adjacent key lever is carried simultaneously forward with the feeling lever the greatest distance and its uppermost stop shoulder is carried into the path of the stop lug of the controlling arm. The succeeding parts of the spiral surface of the trip cam are so constructed that they rise progressively higher and arrest the forward movement of the feeling lever when the same has carried the adjacent key lever with its corresponding stop shoulder into the path of the stop lug of the controlling arm. This forward movement of the feeling lever and that of the upper arm of the key lever is gradually reduced as the progressively higher parts of the trip cam are presented to the feeling finger, and when the highest part of the trip cam is presented to the feeling finger, the feeling lever is prevented from moving forward at all and the upper arm of the key lever is not moved with its locking shoulder out of engagement with the locking stop of the controlling arm and consequently the companion gear segment connected therewith is held against downward movement. After the rocking frames 15 and 29 have been turned forwardly sufficiently to engage the several feeling fingers of the feeling levers with their respective trip cams, the rear ends of the segmental notches 28 in the rocking frames engage with the cross bar 25 and depress the same, thereby moving the lifting bar 22 downwardly and at the same time pulling down the springs 27. This downward pull on these springs causes each spring to pull its respective gear segment down as far as possible, and after the downward movement of the segment has been arrested the continued downward movement of the cross bar 22 together with the rocking frames simply stretches these springs until this bar reaches the end of its downward movement. If a gear segment is locked in its uppermost or zero position its spring 27 will be stretched its fullest extent, whereas, if a gear segment moves downwardly more or less before it is arrested by its shifted key lever, its spring 27 will be stretched less in proportion. This downward movement of the gear segments which are free to move in this direction takes place while the gear segments are in their retracted position and out of engagement from the dial pinions, so that the dials are not affected by this movement of the segments.

After the rocking frames have reached the end of their forward movement and the roller 73 has dropped off from the rear end of the concentric portion 69 of the cam 67, the gear segments are moved forwardly by hand operated mechanism into engagement with their respective dial pinions and are held in this position during the entire subsequent backward movement of the rocking frames, which is effected by hand operated mechanism. During the backward movement of the rocking frames, the gear segments are raised to their highest positions, while in engagement with the dial pinions, by the rod 22 and connecting parts and turn the dials backwardly. At the end of the upward movement of the gear segments the latter are released, so as to permit them to move into their retracted position, out of engagement from the dial pinions.

During this operation, those gear segments which are held or locked in their highest positions, by reason of their dials being at zero, are simply moved forward at the end of the forward movement of the rocking frames, so as to engage with their respective dial pinions and are again moved backwardly out of engagement therefrom at the end of the forward movement of the rocking frames, without disturbing their respective dials. Each of the unlocked gear segments is moved downwardly a number of spaces corresponding to the number which is registered on its dial, the extent of this movement being controlled by the companion trip cam which arrests the forward movement of the key lever, through the medium of its feeling lever, when the proper stop shoulder of the key lever has been presented to the controlling arm.

Upon now moving the gear segments forwardly in their variously depressed positions and then raising them to their highest position, each depressed gear segment will turn its dial backward the same number of spaces that the gear segment was depressed. Inasmuch as each gear segment was permitted to descend by its trip cam, feeling lever and key lever the same number of spaces as the number indicated on its dial, the gear segment subsequently moves upwardly the same number of spaces before reaching its highest position, thereby turning it backwardly the same number of spaces and restoring the same to zero.

The mechanism whereby the positions of the cam 14 and 67 are reversed preparatory to restoring the dials to zero is constructed as follows:

The cams 14 and 67 drop into their operative position by gravity. Each of these cams is provided in rear of its pivot with a tail 75 which is depressed when it is desired to lift the respective cam into its inoperative position.

76 is a shifting lever which is pivoted at its lower end and is normally turned so that its upper end is disengaged from the rear side of the tail on the cam 14, by a spring 77, as shown in Figures 2 and 7. The member 76 projects in rear of the main frame so as to be accessible for manual operation.

78 is a shifting lever which is pivoted between its upper and lower arms and arranged with its upper arm in rear of the tail of the cam 67 and normally held in engagement therewith by a spring 79, as shown in Figure 12. 80 represents an elbow lever pivoted below the bottom of the keyboard, as represented in Figure 12.

81 represents a main line or cord which is connected with the lower arm of the elbow lever 80 and which is provided at its rear end with two branches 82 and 83. The branch 82 connects with the shifting lever 76 above its pivot, and the branch 83 connects with the shifting lever 78 below its pivot. 84 represents a total or shifting key having a depending stem which is guided in top and bottom of the key-board and which bears with its lower end against the upper arm of the elbow lever 80. Upon depressing the key 84, the elbow lever 80 is turned, so as to draw the cords or lines 81, 82 and 83 forwardly, thereby moving the upper end of the shifting lever 76 into engagement with the tail of the cam 14 and lifting the same into an inoperative position, while the shifting lever 78 is moved rearwardly with its upper arm from the tail of the cam 67, thereby allowing the latter to drop into its operative position. Upon depressing the gear segments while the parts are in this shifted position, the segments move downwardly out of engagement with the dial pinions. After the gear segments have been depressed they are moved forwardly into engagement with their respective dial pinions by an elbow lever 85 which is connected with its lower arm by a line or cord 86 to the rod or bar 7, as shown in Figure 12, or to one of the rock arms 8. The elbow lever is turned in the proper direction for this purpose by a shifting key 87 having a depending stem which is guided in the top and bottom of the key-board and which bears against the upper arm of the elbow lever 85. After the gear segments have been moved forwardly into engagement with th dial pinions, while in the depressed position, the gear segments are retained in forward position, and at the same time raised until they reach their uppermost position, whereby the dials are turned to zero. The shifting key 87 is now released which permits the spring 11 to move the gear segments rearwardly out of engagement with the dial pinions. The key 84 is also released, thereby permitting the shifting levers 76 and 78 to resume the positions shown in Figures 2 and 12, leaving the machine in position to resume adding.

Each of the dials is held against turning while out of engagement with its companion gear segment, by means of a detent pawl 103 which engages with the front side of its companion gear pinion, as shown in Figures 2 and 7. The pawls 103 of the several gear pinions are mounted on a transverse pawl bar 104, which is supported at its ends by means of two pawl arms 105, which turn loosely upon the supporting rod or bar 35 of the key levers. The pawl arms are moved rearwardly for engaging the pawls of the bar 104 with the gear pinions by means of springs 106 (Fig. 12). These springs are connected loosely at their rear ends to the rock shaft 9 and at their front ends to the pawl arms 105. During the forward movement of the gear segments preparatory to turning the dial pinions, the detent pawls are swung forwardly out of engagement with the dial pinions by means of two shifting rods 107 which are connected at their rear ends to opposite ends of the transverse rod 7 or some part moving therewith and each of which is provided at its front end with a fork or bifurcation 108, which engages with a pin or shoulder 109 on the pawl arm arranged on the adjacent side of the machine. As the gear segments move forward into engagement with the gear pinions the shifting rods 107 move the detent pawls 103 out of engagement with the dial pinions, and when the gear segments move backwardly the detent pawls are again engaged with the dial pinions by the springs 106.

*Recording mechanism*

For the purpose of recording the numbers which are added together by the above described mechanism a recording mechanism is provided which is constructed as follows:

140 represents a printing roller or platen which is arranged transversely in the upper, rear part of the machine and under the lower side of which the sheet or other article is placed which receives the record. 141 represents a number of type segments which are pivoted at their front ends to the supporting bar 31 upon which the rear ends of the controlling arm 30 are pivoted. Each of these type segments is provided at its rear end with a segmental row of type carriers 142, which are capable of moving radially back and forth on the type segment.

Each of the type carriers is provided at its rear end with a type and is guided upon the type segment by means of screws or rivets 143 secured to the type carrier and arranged in radial slots 144 formed in the type segment, as shown in Figures 2, 3 and 14. Each of the type carriers is held in its inward or retracted position by means of an S-shaped spring 145, which is arranged between the carrier and the type segment and is secured with one end to the carrier, and with its other end to the type segment, as shown in Figures 13 and 14. Upon raising or lowering the segment any one of its type can be brought to the printing point or line, and upon striking the back or inner end of the type carrier, when the same is in line with the printing point the type carrier will be driven outwardly and its type will produce an impression on the sheet supported by the platen. After the carrier has received the blow for driving the same against the platen, the carrier is again quickly retracted to its innermost position by means of its spring.

Each of the type segments is connected with one of the controlling arms, so that upon depressing a controlling arm, and the registering gear segment connected therewith, the companion type segment will be raised and present one of its type to the printing point.

For convenience in operating the machine, the keys are separated a considerable distance on the key-board and in order to produce a compact record, the printing segments are arranged closer together than the keys and the registering mechanism. In order to permit of this arrangement, each type segment and its corresponding controlling arm are connected by a connecting arm 146, as represented in Figures 1, 2 and 10. The connecting arms of the central controlling arms and type segments are comparatively straight, but the connecting arms of the outer type segments and controlling arms are arranged obliquely, the degree of this obliquity gradually increasing from the central type segments and controlling arms in opposite directions toward the outer type segments and controlling arms, as represented in Figure 1. The connecting arms 146 of the outer controlling arms are arranged in the spaces behind the upright parts and above the horizontal parts of the controlling arms, thereby permitting the inner controlling arms to move up and down without interfering with the connecting arms 146 of the outer controlling arms.

The types on each type segment are arranged to correspond with the teeth and numbers of its companion gear segment and registering dial, the zero type being at the upper end of the series and the progressively higher digits arranged in their order from the zero type. When the registering gear segment is in its highest position it presents its zero tooth to the dial pinion, and the type segment which at this time is in its lowest position presents its zero type to the printing point. Upon depressing a gear segment so as to present one of its highest teeth to the dial pinion, its companion type segment is raised proportionately and presents a corresponding higher numbered type to the printing point.

147 represents a number of hammers whereby the type carriers are struck for driving the type against the platen. One of these hammers is arranged adjacent to each type segment and is provided with a head which is arranged in front of the series of types and in line with the printing point of the platen. Upon shifting the type segment so as to bring one or another of its type carriers to the printing line and then operating the hammer, the latter delivers a blow against the inner end of the particular carrier which is at the printing point and produces an impression of its type on the platen. The several hammers are pivoted on the transverse rod 12, arranged in rear of the segments and each of the hammers is yieldingly held in its forward position by a spring 148 connected at its lower end to a cross bar 149 and at its upper end to a depending arm 150 on the hammer.

151 represents a vertically movable trip bar or rod which is arranged transversely below the hammers and whereby the latter are operated. This bar is supported at its ends upon the rear end of the rock arms 152 which turn loosely with their front ends on the rod 31 supporting the type segments and controlling arms.

153 represents a number of hammer or trip pawls, whereby the hammers are retracted preparatory to delivering a blow against the type carriers which are at the printing point. One of these pawls is arranged adjacent to each hammer and pivoted loosely at its lower end to the trip bar 151, and its upper end is provided on its rear side with a downwardly facing hook or shoulder 154, and above said shoulder with a trip face 155, as shown in Figures 3, 4, and 6. Each of the hammers is provided in front of its pivot adjacent to the upper end of the hammer pawl with a lower trip lug or shoulder 156 and an upper trip lug or shoulder 157. When the parts are at rest the hammer pawl 153 is raised into its highest position and the hammer is in its normal position with its lower trip lug 156 below and in rear of the hook of the hammer pawl and with its upper shoulder 157 in rear of the trip face of the hammer pawl, as represented in Figures 2, 3 and 4.

Upon shifting the hammer pawl rearwardly, while the parts are in this position, so that its hook overhangs the lower shoulder 156 of the hammer, and then pulling the hammer pawl downwardly, the hook of the hammer pawl engages with the lower shoulder of the hammer and turns the same so that its head is retracted from the type carrier at the printing line. As the hammer moves downwardly with the hammer pawl, the upper shoulder of the hammer comes into engagement with the trip face of the hammer pawl and during the continued downward movement of the hammer and its pawl, this upper shoulder gradually crowds the hammer pawl forwardly with reference to the hammer by reason of the hammer and its pawl swinging on different centers. During the last portion of the downward movement of the trip bar 151 and the hammer pawl mounted thereon, the pawl is crowded forwardly by the upper shoulder 157 of the hammer to such an extent that its hook is disengaged from the lower shoulder 156 of the hammer, thereby liberating the latter and permitting its spring 148 to throw the same quickly and deliver a blow against the type carrier at the printing line. The trip bar 151 now rises and carries the hammer pawl into its highest position, preparatory to again engaging the hammer for depressing the same.

158 represents a number of upright shifting arms whereby the hammer pawls are moved rearwardly so that their hooks engage with the lower shoulders of the hammers. One of these arms is arranged adjacent to each hammer pawl, as shown in Figures 3, 4, and 6, and is pivoted at its lower end on the strip bar 151, and its upper end is provided with a roller or projection 159 which bears against a hammer cam 160 on the lower part of the adjacent type segment, as shown in Figures 3, 7 and 10. This hammer cam is provided at its upper end with a receding or low portion, and inclined portion arranged below the low portion and a concentric or high portion arranged below the inclined portion. Each shifting arm 158 is moved forwardly and its roller is yieldingly held in engagement with the adjacent hammer cam by a spring 161 connecting said arm with a cross bar 162 secured to the rock arms 152, as represented in Figures 7 and 8. The backward movement of each hammer pawl with reference to its companion shifting arm is limited by means of a stop 163 secured to the upper portion of the hammer pawl and engaging with the front side of the shifting arm, as represented in Figures 3, 4, and 5.

Each hammer pawl is yieldingly held in its rearmost position with reference to its shifting arm by means of a C-shaped spring 164 secured with its ends, respectively, to the hammer pawl and its shifting arm, as shown in Figures 2, 3, and 4. In the lowermost position of the type segment the receding part of its cam is presented to the roller of the shifting arm 158, which permits the hammer pawl to be retracted into its foremost position, as represented in Figure 2. Upon depressing the trip bar 151 when the parts are in this position, the roller 159 is not engaged soon enough by the incline of the cam 160 to engage the hook of the hammer pawl with the lower shoulder of the hammer, before the hook has passed below this shoulder, but instead the trip face of the hammer pawl slides idly against the shoulder 156 without retracting the hammer, whereby no impression of the particular type at the printing line is produced. If the type segment is raised, so as to present one of its lower types to the printing point or line, the incline of its cam during the first part of the upward movement of the segment moves the shifting arm 158 rearwardly together with the hammer pawl yieldingly connected therewith, so that the hook of the hammer pawl stands over the lower shoulder 156 of the hammer. Upon now depressing the pawl 153 the hammer will be retracted and released near the end of the downward movement of the pawl, and will be quickly swung up by the spring 148, thereby delivering a blow against the type at the printing point and producing an impression thereof. The incline 160 of the type segment cam is so constructed that it throws the hammer pawl backwardly into an operative position when the segment is raised one digit space, during the continued upward movement of the segment, the hammer pawl is held in this operative position by the high concentric part of the segment cam. By thus constructing the type segment cam its companion hammer pawl is not shifted when the segment is not raised and its zero type remains at the printing line, but the hammer pawl is shifted into an operative position for producing an impression, if the type segment is raised one or more digit spaces and presents any one of its digits higher than zero to the printing line.

*Automatic printing of zero*

165 (Fig. 20) represents a number of transfer or coupling fingers which enable the ciphers in a number to be printed automatically. One of these transfer fingers is secured to each of the shifting arms 158, as represented in Figures 3, 4 and 7, and extends laterally toward the right therefrom into engagement with the shifting arm of the next lower hammer pawl, as represented in Figure 20. If any one of the printing segments remains in its lowest position, so that its cipher remains at the printing line and the next higher printing segment has been raised for printing a higher number or digit, the transfer finger of the higher-shifting arm 158 while being moved rearwardly by the cam of its companion printing segment, is caused to engage with the shifting arm 158 of the next lower hammer pawl and shift the latter backwardly, so that its hook is carried backwardly over the lower shoulder of the companion hammer. Upon now depressing the trip bar 151, the higher hammer pawl 153 is coupled with its hammer and the next lower hammer pawl is also coupled with its hammer, whereby an impression of the cipher or zero type on the lower segment is produced on the platen at the same time that the next higher number is printed on the platen.

If two ciphers occur in succession in the body of a number, the shifting arm to the left of the highest order printing segment to be operated for printing a zero sets the hammer mechanism of said highest zero-printing segment by means of the transfer finger of said shifting arm and the shifting arm of said highest zero printing segment in turn by means of its transfer finger sets the hammer mechanism of the printing segment of next lower order, etc.

This operation of producing an impression of the cipher type is effected automatically and renders it possible to print any number of ciphers in succession in the body of a number because the hammer operating mechanism of each segment which remains standing with its upper type at the printing line is controlled by the hammer operating mechanism of a higher type segment and in turn controls the hammer operating mechanism of the next lower type segment, if the next lower segment presents a cipher to the printing line. Only the ciphers below the highest digit in the number to be recorded are thus printed automatically, because the printing of a digit depends upon the upward movement of a printing segment thereby avoiding the printing of ciphers ahead of the highest digit in the number to be recorded. The hammer shifting device of the segment which prints the numbers representing units of cents is, preferably, not provided with a transfer finger to operate on the hammer shifting device of the segment which prints fractions of a cent, because it is proper that the space to the right of the lowest integer shall remain blank when no fraction is recorded therein.

The carrying bar 151 is raised by one or more springs 166 which connects this bar with the transverse rod 12, as shown in Figure 8, and the upward movement of the bar 151 is arrested when the hammer operating pawls reach their highest position, by a transverse bar 167 which is engaged by the rear ends of the rock arms 152. 168 represents a coupling hook, whereby the hammer trip devices are depressed. This hook is pivoted with its upper end to the trip bar 151 and its lower engaging end is provided with a notch having upper and lower shoulders.

In the lowered position of this hook its notch engages with a cross bar 169 which is connected with the rock arms 24, as represented in Figures 2 and 7, so that the hook and the hammer operating devices connecting therewith are actuated from the rocking frames 15 and 29, through the medium of the rock arms 24. In the rearmost position of the rocking frames, the front ends of their notches 28 bear against the front side of the bar 25 to which the gear segments are yieldingly connected and the cross bar 169 bears against the rear or upper shoulder of the notch of the hook 168, as represented in Figure 2. Upon swinging the rocking frames forward, the incline of the cam 14 first raises the rock arm 13 and shifts the gear segments into engagement with the dial pinions, and after the segments have been so shifted, the rear shoulders of the notches 28 in the rocking frames engage with the cross bar 25, so that thereafter this bar is carried downwardly with the rocking frames and the gear segments are depressed. During this downward movement of the bar 25 with the rocking frames, the companion bar 169 moves down idly in the notch of the hook 168 until this bar engages with the lower or front shoulder of this hook. After the cross bar 169 engages with the lower shoulder of the notch of the hook, the latter and the hammer operating devices connected therewith are moved downwardly with the rocking frames until these frames reach the end of their downward movement. During the last portion of the downward movement of the rocking frames the hammer pawls are disengaged as before described, from the retracted hammers, whereby the latter are released and strike the type carriers which are at the printing line. By this means, the blow of the hammers is delivered after the registering of the numbers has been effected on the dials and the type segments have been shifted into their proper position for recording the respective number.

The hammers do not follow the type carriers to the end of their outward movement but are stopped short after delivering a blow against the inner ends of the carriers by their depending arms 150 engaging with a rubber facing 170 on the cross bar 167, as shown in Figure 3, so that the types are moved outwardly by the impact of the hammers and are then returned by their springs so as to clear the printing surface.

When it is desired to print or record the total at the foot of the column of the numbers which have been printed, the operation is as follows: The total key 84 is first depressed, thereby raising the cam 14 into an inoperative position and lowering the cam 67 into an operative position. Upon now moving the rocking frames 15 and 29 forwardly the feeling levers 61 are turned so as to move their feeling fingers forwardly into engagement with the respective cams 57 and at the same time each feeling lever carries the adjacent key lever forwardly so that its particular stop shoulder 39 corresponding to the position of the trip cam 57 and its dial is moved into the path of the stop lug 34 of the controlling arm. After the key levers have been thus shifted forwardly into their respective positions corresponding with their dials, the continued forward movement of the rocking frames causes the gear segments while in a retracted position out of engagement with the dial pinions to be depressed until each segment is arrested by the engagement of the stop lug on its controlling arm with the respective stop shoulder of its key lever; whereby each printing segment is raised so as to present the type carrier to the printing point which carries the type corresponding to the number registered on its companion dial. During the last part of the forward and downward rocking movement of the rocking frames the hammers are operated and the particular type at the printing line are impressed on the platen. Upon now swinging the rocking frames backward, the gear segments are raised while still in a retracted position out of engagement with their companion dial pinions, thereby permitting further numbers to be added to the total already registered on the dials. If, however, it is desired to turn the dials back to zero, after the total of the added numbers has been printed or recorded, the gear segments, while in the retracted lower position which they occupy while printing the totals, are moved forwardly into engagement with their respective dial pinions by the depression of the key 87. Upon now moving the rocking frames backwardly the gear segments are raised while in their forward position in engagement with their pinions, whereby each of the latter is turned backwardly and when the segments reach the end of their upward movement, the dials have been turned backwardly a number of spaces corresponding to the number on the dial, thereby turning all of the dials to zero.

Word printing mechanism

For the purpose of permitting words to be printed in front of the numbers which are added together the following mechanism is provided:—

1411 represents a word-printing segment which is mounted loosely on the rod 31 next to the highest number printing segment of the main number recording mechanism, as represented in Figures 1, 8, 19 and 20. This segment is provided with a number of radially movable carriers 1420, which are constructed the same as the carriers of the number printing segment and each of which is provided on its face with a word type. The words of these types are selected according to the purpose of business for which the machine is to be used. For instance, if the machine is to be used in a bank, types representing the words "Vouchers," "Checks," "Drafts," "Bills," and similar words common to the banking business can be used. When the machine is designed for use in a restaurant the words "Soup," "Vegetables," "Meats," "Dessert," and other words peculiar to this business may be used.

The position of the word type segment is controlled by a key lever 3600, Fig. 8, which turns on the bar 35, is similar to the number key levers and is provided on the front side of its upper arm 3700 with a vertical series of differential stops or shoulders 3900 which are adapted to be engaged by the stop lug 3400 of a controlling arm 3000; and lever 3600 is also provided with a locking stop or shoulder which is adapted to be engaged by a locking lug 3300 on the controlling arm, as represented in Figure 8. The controlling arm 3000 is connected with the word printing segment by a connecting bar 1460. The stop shoulders on the upper arm of the word key lever are so arranged that upon swinging this lever so as to carry different shoulders into the path of the stop lug on the controlling arm, the latter will be arrested at different points in its downward or forward movement and the word printing segment connected therewith will be stopped at different points in its upward movement and present to the printing point the particular word type which corresponds with the shoulder or stop on the word key lever. The upward movement of the controlling arm 3000 is limited by its rear locking lug 3300 engaging with the stop bar 32 which arrests the upward movement of the controlling arms 30 of the number registering and recording mechanism. The downward movement of the word printing segment is effected by a spring 215 which yieldingly connects this arm with the bar 25 to which the registering gear segments are connected.

216 (Fig. 1) represents a row of word keys having depending stems which are guided in the top and bottom of the key-board and which engage against the upper side of the front arm 3600 of the word key lever at different distances from the fulcrum thereof. Upon depressing any of the word keys, the word key lever will be turned the proper distance to bring its proper stop shoulder into the path of the stop lug of the companion controlling arm and arrest the word type segment during its upward movement, when the word type corresponding with the word of the depressed key has reached the printing line. When the respective word type is in this position the same is driven against the recording surface for producing an impression thereon, at the same time that the printing of the numbers by the number printing type segments is effected. The word types are driven against the platen by a hammer operating mechanism which is constructed the same as the hammer operating devices of the number printing mechanism and the same letters of reference are therefore used to denote the same. The word key lever is yieldingly held in its normal position by a spring 600.

*Counting and numbering mechanism*

An auxiliary adding and printing mechanism is provided which permits of registering and recording the individual or separate number of adding and recording operations which have been made by the main adding mechanism.

This auxiliary mechanism is constructed as follows:

2000 (Fig. 9) represents a number of counting dials which are mounted on the left hand end of the dial shaft 3. 5000 (Figs. 21 and 22) represents a number of co-operating gear segments which are mounted on the transverse rod 7 and are adapted to engage with gear pinions 400 on the counting dials as represented in Figure 9. Each gear segment 5000 is connected with a controlling arm 3001 arranged adjacent to the gear segment, by a latch or coupling which at times permits the segment to move independently of the controlling arm. 3601 and 3701 represent stop levers, which may be operated by auxiliary number keys 401 (Figs. 1 and 9). The stop levers 3601 and 3701 may also be operated automatically in the manner to be hereinafter described.

The detail construction of the dials, gear segments, printing segments, stop levers and the parts co-operating therewith of the counting and numbering mechanism is substantially the same as the construction of the same parts in the main registering and recording mechanism, except as hereinafter distinguished, and the same characters of reference are therefore employed to denote like parts in both of these sets of mechanisms.

In the drawings, two banks of auxiliary keys and three counting dials are shown, which permits of printing items of two digits, and counting and numbering a total of 999, but additional devices may be employed if it is desired to increase the capacity of the auxiliary section of the machine.

In the counting mechanism each of the higher gear segments 5000 is provided with a pivot latch 501 the same as in the main registering mechanism. The lowest or primary gear segment of the counting mechanism is provided with a movable latch 502 which is adapted to be engaged with or be disengaged from the upper guide face on its companion controlling arm. This latch is pivoted on the primary gear segment and yieldingly held in position by a spring 217 shown in Figure 22, so as to overhang the horn of its companion guide arm, as shown in Figs. 9 and 21, while upon moving the latch rearwardly so as to clear the controlling arm its gear segment is permitted to drop until a stop 490 on the segment adjacent to the latch bears against the controlling arm. The extent of this drop of the primary segment independent of the controlling arm is equal to one space or number of the registering mechanism the same as in the higher counting devices. In the counting mechanism, the gear segments are not provided with lower stops 46 like those of the gear segments of the main registering mechanism, which permits the counter controlling arms to move downwardly when necessary independently of the co-operative gear segments. The upward movement of the counter gear segments is limited by stops 218 with which the upper ends of the gear segments engage. 219 represents a foot formed on the lower side of each controlling arm 3001 and adapted to engage with the lifting cross bar 22.

220 represents the springs whereby the counter controlling arms are connected with the cross bar 25. The springs 220 are provided at their lower ends with vertically elongated loops 221 which receive the bar 25, as shown in Figure 9, and which form a slack connection between the springs 220 and the bar 25.

222 represents a number of auxiliary or counting stops, whereby the gear segments, when in their foremost position, are permitted to move downwardly only one space for counting the number of additions which have been made by the main registering mechanism. One of these stops is arranged adjacent to the left hand side of each counting controlling arm and is provided on the upper side of its rear end with a curved guide face and is in line with the upper curved bearing face of the controlling arm when the latter is in its highest position, as represented in Figures 9 and 21. The several stops 222 are secured with their front ends to a transversely movable slide 223 which is adjustably secured to the underside of the cover 224 of the registering mechanism by a screw 225 passing through a transverse slot 226 in the cover, as represented in Figs. 1, 9 and 21. While slide 223 as shown in the parent case and other divisions thereof, is movable for bringing the stops 222 into and out of operative position; for the purpose of the present application, it is to be considered that the slide is securely attached to the frame with the stops 222 in permanent operative position.

227 represents a trip finger secured with its front end to the slide 223 and arranged with its rear end adjacent to the front side of the latch 502 of the primary or units gear segment.

228 represents an elbow lever arranged below the bottom of the keyboard and having its lower arm connected with each of the upper arms of the feeling levers 610 of the counting and numbering mechanism, by springs 229, as shown in Figures 9 and 12. 230 represents a key having a depending stem which is guided in the top and bottom of the keyboard and which bears against the upper arm of the elbow lever 228. The key 230 like the total printing and other keys in this bank is provided with a shoulder 329 adapted to be engaged by a ledge 328 on the latch bar 327 thereby latching this key down when desired. With the key 230 thus latched down the total levers 610 are held in engagement with the cams 57 on the dials 2000.

Previous to beginning the consecutive counting and recording of the separate additions of the main registering mechanism, the dials are all turned to zero, in which position all of the upper key lever arms 3701 are in their rearmost position and have their locking shoulders 38 in engagement with the locking lugs 33 of the auxiliary controlling arms, whereby the latter are held in their highest position. Upon moving the rocking segments 15 and 29 forwardly after depressing the proper keys of the number to be added on the main registering mechanism, the gear segments are all moved forwardly into engagement with their respective dial pinions and the springs 27 of the several gear segments are then pulled downward by the bar 25.

During the forward movement of the auxiliary tens and hundreds gear segments their latches 501 engage with their companion controlling arms which prevents these gear segments from being depressed by the pull of their springs 27, whereby the tens and hundreds dials are not turned. During the forward movement of the primary or units gear segment its latch 502 engages with the trip finger 227 and is turned backwardly out of engagement with the top of its companion controlling arm, thereby releasing the units gear segment and permitting the same to be pulled downwardly by its spring 27, while in engagement with its gear pinion, whereby the units-dial is turned. As the auxiliary gear segments move forwardly into engagement with the dial pinions, their lugs 490 move over the stops 222, but in the foremost position of these gear segments their stop lugs 490 are separated from the stops 222 a distance equal to one tooth of the segments or one space on the dials. The instant the latch 502 of the units gear segment is released from the units controlling arm, while the units gear segment is in its foremost position the pull of the spring 27 depresses the units segment until its stop lug 490 engages with the units stop 222, this movement of the units gear segment causing the same to turn the units dial one space or number. During the subsequent backward movement of the rocking segments 15 and 29, the auxiliary gear segments are withdrawn rearwardly from the dial pinions. While in this rearwardly retracted position the units gear segment is raised by the bar 22 and when the same reaches the upper end of this movement, the latch 502 is automatically turned over the units controlling arm by the spring 217 of this latch. This operation is repeated and the units dial is turned one space at a time during every adding operation of the main registering mechanism. When the units dial makes one complete rotation, the companion cam 57 releases the units trip arm 54, thereby causing the same to disengage the latch 501 of the auxiliary tens gear segment from the tens controlling arm, whereby the tens gear segment is liberated and permitted to be pulled downwardly by its spring 27 during the subsequent forward movement of the rocking segments 15 and 29. The tens gear segment moves downwardly until its stop lug 490. engages the adjacent tens stop 222, during which movement the tens gear segment turns the tens dials one space. During the subsequent backward movement of the rocking frames 15 and 29, the tens gear segment is moved backwardly by the springs 11 out of engagement with its dial pinion and upwardly by the bar 22 while in its retracted position at the same time that the units gear segment is retracted and moved upwardly. At the end of the upward movement of the tens gear segment, its latch 501 is again turned by its spring into engagement with the tens controlling arm. When the tens gear segment has turned the tens dial one rotation, the auxiliary hundreds gear segment is released by the carrying mechanism between the tens and hundreds registering mechanisms and the hundreds dial is shifted by its gear segment in the same way.

At the beginning of the counting operation, the cams 57 engage with their highest parts against the feeling fingers of the feeling levers whereby the upper arms of the key levers are permitted to occupy their rearmost position with their locking shoulders 38 in engagement with the locking lug 33 of the controlling arms, thereby preventing these arms from being depressed by the pull of their springs 220 upon moving the rocking frames 15 and 29 forwardly. Upon counting the first number on the units dial, the total cam 57 thereof, while being shifted with said dial permits the units feeling lever to drop with its feeling finger 62 from the highest to the lowest part of the units cam, thereby causing the upper arm of the key lever to be moved forwardly by the feeling lever, so that the uppermost stop shoulder 39 of the key lever stands in the path of the stop lug of the units controlling arm. In this position of the parts, the units controlling arm is arrested after being moved downwardly one space by the pull of its spring 27 which is strained by the forward movement of the rocking frames 15 and 29. As the counting on the units dial progresses, the units cam engages its successively higher parts with the feeling finger of the units feeling lever and moves the same rearwardly one space for each counting operation, and the springs 60 of the units key lever turns the upper arm of the latter backward intermittently in the same measure as the backward movement of the feeling lever permits the same. During every backward step of the upper arm of the units key lever the latter presents a successively lower stop shoulder 39 to the stop lug 34 of the units controlling arm, whereby the latter is permitted to be drawn down by its spring 220, one space farther during every counting operation, although its companion gear segment during this time never moves down more than one space by reason of its stop lug 490 engaging its stop 222, thereby causing its companion printing segment to be shifted to the proper position for printing the number corresponding to its dial. During the upward movement of the units gear segment its controlling arm is also moved upward to its highest position by the rod 22 engaging with the foot 219 of the controlling arm.

When the dial of each register except the highest has completed one rotation the highest part of its cam has turned the feeling lever backwardly to its fullest extent, and the upper arm of the respective key lever is again engaged with its locking shoulder underneath the locking lug of the respective controlling arm. The loops 221 at the lower end of the lower controlling arm springs 220 are of such length, as to permit the gear segment to descend in advance of the controlling arms and first turn the dials and cams one space and then the rod 25 engages with the lower end of the loops 221 and pulls the controlling arm downwardly, until each is arrested by the proper stop shoulder 39 on the upper arm of its key lever. By thus moving each lower gear segment down in advance of its controlling arm the respective grand-total cam upon turning from 9 to 0 permits the upper arm of the key lever to be shifted rearwardly and moved with its locking shoulder underneath the locking lug of its controlling arm before the latter can descend, thereby holding the controlling arm and the segment in the highest or zero position if the dials while registering move to zero.

When turning the dials of the counting mechanism to zero, the latches 501 and 502 and stop lugs 490 (Fig. 21) of the auxiliary gear segments are moved downwardly in rear of the stops 222 and the trip finger 227, as the gear segments descend in their rearward position. These segments, while in their lowered position, are now moved forwardly into engagement with their dial pinions. During the subsequent ascent of the gear segments in their forward position the stop lugs 490 and the latches 501 and 502 of the segments deflect the stops 222 and the trip finger 227, so as to permit these lugs and latches to be moved above the said stops and fingers preparatory to beginning the next counting operation. The co-operating sides of the lugs 490, latches 501, 502, stops 222 and finger 227 are slightly inclined, as shown in Figures 9 and 21, and are sufficiently elastic to permit these parts to pass each other.

231, Figure 9, is an upright shifting lever, whereby the operation of the printing mechanism of the counting and numbering mechanism may be controlled. This lever is provided on its upper arm with a cross bar 232 which is arranged in rear of the hammer actuating pawls of the numbering printing segments and its lower arm is connected by a wire or cord 233, with a thumb piece 234 which is guided in an opening in the front part of the frame as shown in Figure 9. The lever 231 is turned by a spring 235 in the direction for moving its cross bar forwardly against the auxiliary hammer pawls, thereby holding the same out of engagement with the hammers 147 of the auxiliary printing segments and preventing the same from effecting recording on the impression surface. Upon pulling the thumb piece 234 forwardly, the lever is turned so as to move its cross bar rearwardly away from the hammer pawls, thereby permitting the same to operate the hammers of the numbering printing segments. The shifting lever is held in its operative and inoperative positions by two shoulders 236 and 237 arranged one behind the other on the thumb piece and adapted to engage with the edge of the opening in which the thumb piece is guided.

By means of this counting and numbering mechanism, numbers may be printed consecutively on the record sheet by simply rocking the handle 21 back and forth. While thus printing numbers consecutively, if none of the registering keys are depressed, the gear segments of the main registering mechanism are moved idly back and forth.

It will be noted that the numbering type in the auxiliary section of the machine can be used to print numbers under the control of the auxiliary numeral keys 401 while at the same time counting is automatically effected on the counter dials 2000. To bring about this result the slide 223 is placed in position to control the auxiliary control arms 3001 for counting the operations of the machine. At each operation in which the auxiliary gear segments are moved forward the finger 227 displaces the latch 502 and causes the addition of a unit in the units counting dial. However, the key 230 being in elevated position, the feeling levers 610 do not engage the cams 57 (of the auxiliary dial wheels), and the stop levers 3601 and 3701 are under the control of the zero stops 33 and the auxiliary numeral keys 401. Thus, when an auxiliary numeral key is depressed its associated lever will be positioned accordingly, and upon the operation of the machine its control arm 3001 and with it the associated type carrier will be positioned in accordance with the value of the key depressed, all as more fully described in connection with the main accumulator. Near the end of the forward stroke of the operating handle the type hammers 147 are operated as heretofore described, printing upon the record sheet the number which has been set up on the auxiliary keys 401 in the same operation in which a unit has been added on the counting dials 2000. Thus, it is possible to print car numbers, folio numbers, or any other identifying number opposite each of the items which is printed on the record and added in the main accumulator while at the same time preserving a count of the number of items added upon the counter dials 2000.

*Indicator or detector dials*

In order to enable the operator to see which particular character or characters the machine is set for printing after depressing the keys and thereby detect any errors in the depression of the keys, each of the key levers is provided with an auxiliary dial indicator or detector 238 which is turned forward the same number of spaces that the key lever has been depressed and then returns to its initial position when the key lever moves backward into its normal position. In the preferred construction of the detector dials shown in Figures 1, 2 and 7, each of these dials consists preferably of a wheel 238 provided on one side with a pinion 239 which is engaged by a gear segment 240 secured to the adjacent key lever.

Upon depressing one of the number registering and recording keys, the detector dial thereof is turned forwardly by the connecting gearing the number of spaces corresponding with the number of the key which has been depressed. If a key lever is not depressed its detector dial remains at zero. The detector dial of the word printing mechanism is in like manner turned by its key lever so as to indicate the word which corresponds to the word of the depressed key.

The detector dials of the several registering and recording devices are mounted loosely on a transverse supporting rod 241.

*Platen mechanism*

The mechanism whereby the platen is supported and operated and the sheet or other impression surface which receives the record is presented to the printing line, is constructed as follows:

The frame of the carriage which supports the platen, paper and inking device consists of a transverse supporting sleeve 260 arranged in rear of the printing mechanism and provided at opposite ends with two upwardly and rearwardly projecting arms 261 and with two upwardly and rearwardly projecting arms 262, as represented in Figures 1, 2, 12, 19 and 20. The supporting sleeve is arranged to slide transversely on a rod or track 263 which is secured with its ends to the sides of the frame.

The platen is journaled in the upper ends of the front arms 261 of the paper carriage and is held in position at the printing line by means of a catch 264 which engages with its front hooked end over a transverse rod 265 arranged below the platen and secured with its ends to the sides of the main frame, as represented in Figures 1 and 20.

When printing upon a sheet of paper, this sheet is fed forwardly underneath the platen and upwardly in front of the same, so that the sheet passes the printing line. The sheet is pressed against the under side of the platen, in rear of the printing line, a transverse presser roller 270 arranged below the platen and journaled with its ends in the front arms 261 of the paper carriage.

*Platen feed or line spacing*

283 (Figs. 1 and 12) represents a platen feed lever which is pivoted loosely on the left end of the platen shaft and which is provided on its rearwardly projecting arm with a pawl 284 which engages with a ratchet wheel 285 secured to the adjacent end of the platen. 286 represents an intermediate actuating lever which is pivoted on the lower part of the front carriage-arm 261 which is adjacent to the ratchet wheel 285. The ratchet lever is connected with the intermediate lever by means of link 287 which is pivoted at its upper end to the rear arm of the ratchet lever and is provided at its lower end with a loop 288 which receives the rear arm of the intermediate lever. 289 represents a spring which connects the front arms of the ratchet lever and intermediate levers. The upper end of this spring is connected with the front arm of the ratchet lever a greater distance from the pivot of the latter than the distance between the connection of this spring with the intermediate lever and the pivot of the latter. By this connection of the spring 289, the leverage of the ratchet lever is greater than that of the intermediate lever which causes this spring, when both of these levers are free, to turn these levers simultaneously in the direction for raising their rear arms, thereby moving the ratchet pawl upwardly or backwardly for taking up a new tooth on the ratchet wheel.

The ratchet pawl is yieldingly held in engagement with the ratchet teeth by means of a spring 290. The movement of the intermediate lever in the direction for raising its rear arm and moving the ratchet pawl backwardly is limited by means of a nose 291 formed on this lever and engaging with a stop on the adjacent arm of the carriage, as represented in Figure 12.

The rocking motion of the intermediate lever is always the same, and in order to enable the same to turn the platen different distances, the rear arm of the intermediate lever is provided on its under side with a number of notches 292 which are arranged different distances from its fulcrum and one or another of which is engaged by the lower end of the loop 288 on the connecting link 287. Upon engaging this loop with the notch of the intermediate lever nearest its axis, the ratchet pawl is shifted so that the platen is turned one line space at a time; while upon shifting this loop into engagement with one of the outer notches of the intermediate lever, the platen will be turned forward by its ratchet mechanism a correspondingly greater distance by the operation of the machine.

The intermediate lever is turned in the direction for shifting the platen by a transverse bar 293 arranged below the front arm thereof, as represented in Figures 1, 2, 7, 12 and 20. This bar is supported upon the upper ends of two rock arms 294 which are mounted loosely with their lower ends on the cross bar 167. 295 represents a depending arm which is preferably formed in one piece with that one of the arms 294 arranged on the left hand side of the machine. This depending arm is provided in a nose which is arranged in rear of and in the path of the rocking frame 29.

During the last portion of the rearward movement of this rocking frame it engages with the nose of the depending arm 295 and moves the same rearwardly, and the upper arms 294 connected therewith are moved forwardly, thereby causing the cross bar 293 to be carried upwardly and turn the intermediate lever in the direction for feeding the platen and paper forwardly. During the forward movement of the rocking frame 29 the rock arms 294 are turned backwardly together with the intermediate lever and connecting parts by the springs 289 preparatory to feeding the platen forward the next space. As the line-spacing of the record sheet by feeding the platen occurs after each item is printed and in the same operation in which said item is printed, the printed record is fed up into visible position at each operation of the machine.

If desired, the platen may be turned by hand when it is desired to adjust the paper, this being effected by releasing the pawl 284 from the ratchet wheel and then turning the platen by means of a button 296 secured to one end of the shaft, as shown in Figures 1, 19 and 20.

The cross bar 293 extends a sufficient distance transversely of the machine so as to engage with the front arm of the intermediate rock lever 286 in all the positions which the paper carriage can be shifted transversely in the machine.

*Horizontally movable carriage*

The paper carriage is capable of sliding lengthwise on the rods 263 and 265 for presenting different parts of the paper to any particular type and is held in its adjusted position by a spacing device which consists of a graduated adjusting sleeve 301 and an adjusting catch 302, as represented in Figures 2 and 18. The adjusting sleeve is revolubly mounted on the supporting sleeve 260 between the carriage frame arms 261 and is provided with two or more longitudinal series of stop notches or graduations 303, 304. The notches in each series may be equidistant and the notches in one series are spaced differently from the notches in the other series, as shown in Figure 18. The catch 302 is pivoted on the rod 167 (Fig. 2) and is yieldingly held in engagement with any one of the notches in the adjusting sleeve 301 by a spring 305. When it is desired to shift the carriage intermittently short distances lengthwise of the platen for writing narrow columns, the adjusting sleeve is turned so as to present its closely spaced notches to the catch, and the latter is shifted from one of these notches to another as the writing progresses. When wider columns are to be written the adjusting sleeve is turned so as to present correspondingly wider spaced notches to the catch. As shown in the drawings, only two series of adjusting notches are provided on the adjusting sleeve, but more series of notches may be provided if necessary.

Any suitable inking means may be employed, and the mechanism shown for this purpose is not fully described in this application, as the specific structure is not an essential part of the invention claimed herein. This specific inking mechanism is fully described in the parent application Serial No. 1,004, now Patent No. 1,429,201, and fully described and claimed in another divisional application Serial No. 254,065, filed September 14, 1918, and eventuating in Patent No. 1,590,024, granted June 22, 1926, to which reference is hereby made.

Any suitable full stroke mechanism may be employed to prevent the operator from making only a partial forward and backward stroke of the rocking frames 15 and 29, and the mechanism shown for this purpose is not fully described in this application. This specific structure is not an essential part of the invention claimed herein, is fully described in the parent application Serial No. 1,004, and is described and claimed in various combinations in the divisional applications Serial Nos. 183,397 and 183,398, to which reference is hereby made.

Any suitable mechanism may be provided to hold the keys when they are moved from normal to operative position, and to release the number keys upon operating the operating mechanism, and therefore the mechanism for this purpose is not fully described in this application. This specific mechanism is not an essential part of the invention claimed herein, is fully described in the parent application Serial No. 1,004, and is described and claimed in another divisional application Serial No. 130,583, filed November 10, 1916, to which reference is hereby made.

I claim:

1. The combination of a plurality of segmental type-carriers; a plurality of types on each of said type-carriers and movable thereby for bringing a type thereof into alignment with a type of another of said type-carriers, a plurality of the types of each type-carrier being integral-digit types and one of the types of each type-carrier being a zero type; driving mechanism for driving types so aligned to print on a record material; operating means for operating said type-carriers and driving mechanism; selecting means automatically operable at each of a plurality of operations of said operating means for determining which of said integral-digit types shall be brought into alignment; and means whereby the movement of one of said integral-digit types will render effective the zero types of the carriers to the right of said moved integral-digit type so that operation of said driving means will effect printing by said moved integral-digit type and the effective zero types, all of the enumerated mechanism co-acting so as to automatically effect printing of numbers in arithmetical progression.

2. The combination of a plurality of segmental type-carriers; a plurality of type on each of said type-carriers and movable thereby for bringing a type thereof into alignment with a type of another of said type-carriers, driving mechanism for driving the types so aligned to print on a record material, operating means for operating said type-carriers and driving mechanism; selecting means automatically operable at each of a plurality of operations of said operating means for determining which of said types shall be brought into alignment, whereby numbers may be automatically printed in arithmetical progression, and a manipulative device for rendering said operating means effective and ineffective with relation to said driving mechanism.

3. The combination of a plurality of segmental type-carriers, a plurality of types on each of said type-carriers and movable thereby for bringing a type thereof into alignment with a type of another of said type-carriers, driving means for driving the types so aligned to print on a record sheet, a plurality of differential stop members one for each of a plurality of said type-carriers for determining the extent of movement of the same, and automatically operating selecting means for controlling said differential stop members to select type in arithmetic progression upon repeated operations.

4. In a counting and numbering mechanism, the combination of an operating device, a counter comprising means for visibly indicating the number of operations of said operating device in a plurality of operations thereof, means whereby each operation of a plurality of operations of said operating device effects a counting of one unit on said counter, and printing types controlled by said counter for printing the number indicated by said counter at each operation of said operating device.

5. In a machine, the combination of a plurality of accumulators, operating means for operating said accumulators, a plurality of types which are always in the same home position when said operating means is inactive, and means for moving said types from home position and causing said types to print at each accumulating operation of said operating mechanism the total then standing on said accumulators.

6. In a counting and numbering machine, the combination of a consecutive counting mechanism, a printing mechanism for automatically printing the numbers as counted by said counting mechanism, operating mechanism for said counting mechanism and separate operating mechanism for said printing mechanism, and manipulative means for rendering said counting mechanism operative and inoperative with relation to said operating mechanism.

7. In a counting and numbering machine, the combination of a consecutive counting mechanism, a printing mechanism for automatically printing the numbers as counted by said counting mechanism, operating mechanism for operating said counting mechanism and said printing mechanism, and manipulative means for rendering said printing mechanism inoperative while said operating mechanism remains operative.

8. In a counting and numbering machine, the combination of a consecutive counting mechanism, a printing mechanism for automatically printing the numbers as counted by said counting mechanism, operating mechanism for operating said counting mechanism and said printing mechanism, and means manipulative for rendering said counting mechanism and said printing mechanism inoperative while said operating mechanism remains operative.

9. In a counting and numbering device, a counter, operating mechanism therefor which automatically effects a one-unit advance of said counter at each operation of said operating mechanism, a member having elements constructed and arranged to correspond to the different positions of said counter, a plurality of printing types, and means for bringing said types into such relationship with said member as to effect printing by said types according to the position of said counter at each operation of said operating mechanism.

10. In a counting and numbering mechanism, the combination of a plurality of counters; operating mechanism operable to cause said counters to accumulate a single unit at each operation of a plurality of operations of said operating mechanism; a plurality of number printing types; and a device controlled by said counters for controlling said number printing type so that said types will print the number accumulated on said counters at each operation of said operating mechanism, the construction and arrangement being such that said counters may be moved independently of the types.

11. In a counting and numbering mechanism, the combination of a plurality of counters; operating mechanism operable to cause said counters to accumulate a single unit at each operation of a plurality of operations of said operating mechanism, a plurality of number printing types; and a plurality of stop devices, one stop device for each of a plurality of said counters and controllable thereby for controlling said number printing types so that said types will print the number accumulated on said counters at each operation of said operating mechanism.

12. In a counting and numbering mechanism, the combination of a plurality of counters; supporting means upon which said counters are mounted so that their axes are in substantially one straight line; operating mechanism operable to cause said counters to accumulate a single unit at each operation of a plurality of operations of said operating mechanism; a printing device comprising a plurality of types and operable by said operating mechanism, to print under control of said counters the numbers counted thereon at each operation of a plurality of operations of said operating mechanism; and a support for said printing device which is different from and not in the same straight line as the supporting means of said counters.

13. The combination of a plurality of counters; operating mechanism operable to cause said counters to accumulate a single unit at each operation of a plurality of operations of said operating mechanism; a plurality of number printing types operable by said operating mechanism for printing the numbers counted by said counters; and a device operable for controlling said operating mechanism to effect printing by said number printing types of the total standing on said counters and under control of said counters while said counters remain unactuated and for effecting turning to zero of said counters at the same operation.

14. The combination of a counting device, a plurality of number printing types operable to print the consecutive numbers counted by said counting device, universal operating mechanism for operating said counting device and said number printing types, manipulative means whereby said operating mechanism may be rendered ineffective with relation to said number printing types during a plurality of operations in which said counting device is operated, a device for controlling said operating mechanism to effect printing by said printing types of the total accumulated on said counting device, the construction and arrangement being such that said operating device is automatically rendered ineffective to cause said counting device to count during such total printing operations.

15. The combination of a plurality of counters; operating mechanism operable for causing said counters to accumulate a single unit at each operation of a plurality of operations of said operating mechanism; a plurality of printing devices, one printing device for each of said counters, each of said printing devices comprising a plurality of number printing types operable by said operating mechanism; a plurality of stop devices, one stop device for each of said printing devices; and a plurality of controlling devices, one controlling device for each of said stop devices, each of said controlling devices being controllable by a respective one of said counters for controlling the respective stop device to determine which of the types of the respective printing device shall effect printing upon operation of said operating mechanism.

16. In a calculating machine, the combination of operating mechanism, a counter which may be operated to count the number of operations of said operating mecahnism, a key for rendering said counter effective for effecting a desired function, means for detaining said key in operative position, and means for releasing said key from the first said means by operation of said operating mechanism.

17. In a calculating machine, the combination of a plurality of accumulation registering dials of successive denominational orders, and means whereby when one of said dials has been moved nine unit-spaces from normal or zero position, and another unit of that denomination is accumulated, the dial will be reversely rotated to normal or zero position and one unit of the next higher denomination will be registered on the dial of next higher denominational order.

18. In a calculating machine the combination with adding and printing mechanism, of a number printing mechanism for printing consecutive numbers in conjunction with items printed by the first said printing mechanism, common operating means for said adding and printing mechanism and said number printing mechanism, and mechanism for rendering said number printing mechanism ineffective while said adding and printing mechanism remains effective.

19. In a calculating machine, the combination of an item accumulating mechanism, an item printing mechanism, a consecutive numbering mechanism for automatically printing the consecutive number of each item of a plurality of items printed by said item printing mechanism and in referential relation thereto, universal operating means for operating said accumulating mechanism and both of said printing mechanisms, and manipulative means co-operative with said operating means for effecting printing by said item printing mechanism of the total of a plurality of items accumulated by said accumulating mechanism and printing by said numbering mechanism of the number of items comprising said total.

20. In a calculating machine, the combination of a set of accumulators, a set of numeral types for printing numbers according to the accumulations of said accumulators, a set of numbering types, automatic mechanism for controlling said numbering types to print numbers in arithmetical progression and in referential relation to the numbers printed by the first said set of types, universal operating means for operating said accumulators and said numeral types, a total key co-operative with said operating mechanism for causing said numeral types and said numbering types to print on a record sheet the total registered on said set of accumulators and the number of items registered on said accumulators and without clearing the latter, and key-controlled means comprising a second key co-operative with said first key and said operating mechanism for causing said numeral types to print on a record sheet the total registred on said set of accumulators and clearing the latter.

21. In a calculating machine, the combination of a set of accumulators, a set of numeral types for printing numbers according to the accumulations of said accumulators, a set of numbering types, automatic mechanism for controlling said numbering types to print numbers in arithmetical progression and in referential relation to the numbers printed by the first said set of types, universal operating means for operating said accumulators and said numeral types and said numbering types, a total key co-operative with said operating mechanism for causing said numeral types to print on a record sheet the total registered on said set of accumulators and without clearing the latter, and key-controlled means comprising a second key co-operative with said first key and said operating mechanism for causing said numeral types and said numbering types to print on a record sheet the total registered on said set of accumulators and the number of items registered on said accumulators and clearing the latter.

22. A calculating machine comprising an accumulator, a rotary platen, a set of types co-operative with said platen so as to print on record material the numbers registered on said accumulator, a second set of types co-operative with said rotary platen, means for causing said second set of types to automatically print the consecutive number of each item in referential relation with said item, and universal operating means for operating said accumulator and both of said sets of types and for effecting rotation of said platen to move said record material relatively to said types.

23. In a machine comprising a plurality of types operable to print on a record sheet, a carriage constructed and arranged to support said record sheet in printing relation to said types and operable to move said record sheet to receive printing from said types in different horizontal positions on said record sheet, the combination of a number printing device, and a manipulative member for operating said number printing device to print on said record sheet, said number printing device automatically operating to print a number at an operation of said manipulative member which number is one unit greater than the number which it printed at the immediately preceding operation of said manipulative member.

24. In a calculating machine, the combination of a plurality of accumulators operable to accumulate items, printing mechanism for printing items accumulated by said accumulators, a counting device for counting and visibly indicating the number of items in a series of items accumulated by said accumulators, numbering types co-operative with said counting device for printing the serial number of each item counted and in referential relation to such item, and universal operating mechanism for said accumulators and printing mechanism and counting device and numbering device.

25. In a calculating machine, the combination of a plurality of accumulators operable to accumulate items, a plurality of counters operable to count the number of items in a plurality of items accumulated by said accumulators, a common shaft upon which said accumulators and counters are mounted, a plurality of items printing type carrying members for printing items accumulated on said accumulators, a plurality of numbering type carrying members co-operative with said counters for printing the serial number of each of a plurality of said items and in referential relation to such item, a second shaft common to and supporting said item type carrying members and said number type carrying members, and universal operating mechanism for operating said accumulators and counters and all of said type carrying members.

26. In a calculating machine, the combination of a plurality of accumulators, a plurality of numeral types for printing items accumulated by said accumulators, a counting device for counting the number of items in a plurality of items accumulated by said accumulators, numbering types co-operative with said counting device for printing the serial number of each of a plurality of said items and in referential relation to such item, a platen common to said numeral types and numbering types for backing record material to be printed upon thereby, and universal operating mechanism for operating said accumulators and numeral types and counting device and numbering types.

27. In a calculating machine, the combination of a plurality of accumulators, a plurality of printing types for printing items accumulated on said accumulators, a counting device for counting the number of items in a plurality of items accumulated by said accumulators, a plurality of numbering types co-operative with said counting device for printing the serial number of each of a plurality of said items and in referential relation to such item, universal operating mechanism for operating said accumulators and printing types and counting device and numbering types, and a device for rendering said operating mechanism incapable of operating said accumulators while said operating mechanism remains capable of operating said printing types, the last said device when operated automatically rendering said operating mechanism incapable of operating said counting device and numbering types to count and number.

28. In a calculating machine, the combination of a plurality of accumulators, a plurality of numeral types for printing items accumulated on said accumulators, a counting device for automatically counting the number of items accumulated on said accumulators, a plurality of numbering types co-operative with said counting device for printing the serial number of each of a plurality of items in referential relation to such item, universal operating mechanism for operating said accumulators and numeral types and counting device and numbering types, and means for rendering said operating mechanism incapable of operating said numbering types while said operating mechanism remains capable of operating said accumulators and numeral types and counting device.

29. In a calculating machine, the combination of accumulating mechanism, a set of numeral types co-operative with said accumulating mechanism so as to print the items accumulated on said accumulating mechanism, a counting device automatically controllable to consecutively count the number of items in a series of items accumulated by said accumulating mechanism, a set of numeral types co-operative with said counting device so as to print consecutive numbers according to the control of said counting device, a hand-controlled operation-controlling member operable at a single operation to effect accumulating by said accumulating mechanism and counting by said counting mechanism and printing by both of said sets of types, and mechanism co-operative with said operation-controlling member for causing at a single operation of said member the first said printing types to print the total amount accumulated by said accumulating mechanism and under control of said accumulating mechanism while the second said types remain ineffective to print from said counting device.

30. In a calculating machine, the combination of accumulating mechanism, a set of numeral types co-operative with said accumulating mechanism so as to print the items accumulated on said accumulating mechanism, a counting device automatically controllable to consecutively count the number of items in a series of items accumulated by said accumulating mechanism, a set of numeral types co-operative with said counting device so as to print consecutive numbers according to the control of said counting device, a hand-controlled operation-controlling member operable at a single operation to effect accumulating by said accumulating mechanism and counting by said counting mechanism and printing by both of said sets of types, and mechanism co-operative with said operation-controlling member for causing at a single operation of said member the second said set of types to print the total standing on said counting device and under control of said counting device while the first said set of types remains ineffective to print the total accumulated on said accumulating mechanism.

31. In a calculating machine, the combination of accumulating mechanism, a set of numeral types co-operative with said accumulating mechanism so as to print the items accumulated on said accumulating mechanism, a counting device automatically controllable to consecutively count the number of items in a series of items accumulated on said accumulating mechanism, a set of numeral types co-operative with said counting device so as to print consecutive numbers according to the control of said counting device, a hand-controlled operation-controlling member operable to effect accumulating by said accumulating mechanism and counting by said counting device and printing by both of said sets of types, and a manipulative element co-operative with said operation-controlling member for causing at a single operation of said member the first said set of types to print the total amount accumulated by said accumulating mechanism and under control of said accumulating mechanism and the second said set of types to print the total standing on said counting device and under control of said counting device.

32. In a calculating machine, the combination of a plurality of accumulators, operable to accumulate items, printing mechanism operable to print items accumulated by said accumulators, a counting device for automatically counting the number of items in a plurality of items accumulated by said accumulators, numbering types co-operative with said counting device for printing the serial number of each item in referential relation thereto, universal operating mechanism for operating said accumulators and printing mechanism and counting device and numbering types, and manipulative means co-operative with said operating mechanism for causing said printing mechanism to print the total amount accumulated on said accumulators and according to the control of said accumulators, said counting device and numbering types being automatically rendered ineffective for counting and numbering such total.

33. In a calculating machine, the combination of a plurality of accumulators, operable to accumulate items, printing mechanism operable to print items accumulated by said accumulators, a counting device for automatically counting the number of items in a plurality of items accumulated by said accumulators, numbering types co-operative with said counting device for printing the serial number of each item in referential relation thereto, universal operating mechanism for operating said accumulators and printing mechanism and counting device and numbering types, and manipulative means co-operative with said operating mechanism for causing said printing mechanism to print the total amount accumulated on said accumulators and according to the control of said accumulators, and causing said numbering types to print the total counted by said counting device and according to the control of said counting device, said counting device and numbering types being automatically rendered ineffective for counting and numbering such total.

34. In a calculating machine, the combination of a plurality of accumulators, printing mechanism for printing items accumulated on said accumulators, a counting device for counting the number of items in a series of items accumulated on said accumulators, numbering types for printing the serial number of each item and in referential relation to said item, universal operating mechanism for operating said accumulators and printing mechanism and counting device and numbering types, a device for rendering said operating mechanism ineffective with relation to said numbering so that items may be counted without being numbered, and manipulative means co-operative with said operating mechanism for causing said printing mechanism to print the total amount accumulated on said accumulators and said numbering types to print the total accumulated on said counting device, said counting device being automatically rendered incapable of counting the total printing operation.

35. In a calculating machine, the combination of a plurality of accumulators, a plurality of numeral types for printing items accumulated on said accumulators, a counting device for counting the number of items in a plurality of items accumulated on said accumulators, a plurality of numbering types co-operative with said counting device for printing the serial number of each of a plurality of items and in referential relation to such item, universal operating means for operating said accumulators and numeral types and counting device and numbering types, and manipulative means co-operative with said operating mechanism for causing a single operation of the latter to effect printing by said numeral types and numbering types of the totals on said accumulators and counting device and to effect clearing of said accumulators and counting device.

36. In a calculating machine, the combination of a plurality of accumulators, a plurality of numeral types for printing items accumulated on said accumulators, a counting device for counting the number of items in a plurality of items accumulated on said accumulators, a plurality of numbering types for printing the serial number of each of a plurality of said items and in referential relation to such item, universal operating mechanism for operating said accumulators and numeral types and counting device and numbering types, a total key co-operative with said operating mechanism for causing the latter at a single operation to effect printing by said numeral and numbering types of the totals standing on said accumulators and counting device and without clearing said accumulators and counting device, and key-controlled mechanism comprising a second key co-operative with said first named key and operating mechanism for causing the latter during a single operation to effect printing by said numeral and numbering types of the totals standing on said accumulators and counting device and to effect clearing of said accumulators and said counting device.

37. In a calculating machine, the combination of a plurality of accumulators for accumulating items, a plurality of numeral types for printing items accumulated on said accumulators, a plurality of manipulative members for controlling the items to be accumulated and printed by said accumulators and types, a second plurality of manipulative members, a second plurality of numeral types controllable by said second plurality of manipulative members to print items in referential relation to items printed by the first said plurality of numeral types, a counter operable to count the number of items of a plurality of items accumulated by said accumulators and printed by the first said numeral types, universal operating mechanism for operating said accumulators and pluralities of types according to the control of the said pluralities of manipulative members, and for operating said counter, and manipulative means cooperative with said operating mechanism for causing the latter at a single operation to effect printing by the first said plurality of numeral types of the total accumulated on said accumulators and to effect printing by said second plurality of numeral types of the total counted by said counter.

38. In a calculating machine, the combination of a number adding and printing mechanism having type, a counting and printing mechanism adapted to count and print the number of adding operations of the machine and having type, and means for moving type of both said mechanisms to effect substantially simultaneous printing thereby.

39. In a calculating machine comprising a plurality of accumulators for accumulating items, a plurality of types for printing items accumulated on said accumulators, a plurality of types for printing words in referential relation to items printed by the first said types, a plurality of manipulative members for determining which of said types shall print, a counting device for counting the number of items in a plurality of items accumulated by said accumulators, in combination a plurality of numbering types controllable by said counting device for printing the serial number of items counted by said counting device and in referential relation to such items printed by the first said types, and universal operating mechanisms for operating said accumulators and said counting device and all of said types.

40. In a calculating machine comprising accumulators operable for accumulating items, a plurality of types for printing items accumulated by said accumulators, a plurality of types for printing words in referential relation to items printed by the first said types, a plurality of manipulative members for determining which of said types shall print, in combination a counting and numbering mechanism for counting the number of items in a plurality of items accumulated by said accumulators and printing the serial numbers of such items in referential relation to such items when printed by the first said types, universal operating mechanism for operating said accumulators and counting and numbering device and all of said types, and a device for rendering said operating mechanism ineffective with relation to the printing of serial numbers by said counting and numbering device.

41. A machine capable of printing a plurality of columns on the same piece of paper, said machine having a totalizer and being provided with means whereby the items of one column only are accumulated in the totalizer, and a total key for effecting a printing of the total of items under the column containing the items which are accumulated in the totalizer; substantially as described.

42. In a calculating machine, the combination of a plurality of sets of accumulators, key mechanism for controlling accumulation of items by one of said sets, mechanism for causing another of said sets of accumulators to automatically accumulate items other than those accumulated by the first said set of accumulators and as an incident to the accumulation of items by the first said set of accumulators, mechanism whereby totals may be printed from said key-controlled set of accumulators and from said automatically controlled set of accumulators, and operating mechanism for effecting operations of said machine according to the controls of said mechanisms.

43. In a machine of the class described, the combination with a totalizer, of a totalizer actuator, means for causing said totalizer to be operated as a consecutive number counter, a type carrier, a differentially movable member controlling the setting of the type carrier, means for operating said member independently of the actuator in counting operations and in unison with the actuator in other operations, and manipulative devices controlling said means.

44. In a machine of the class described, the combination with a totalizer, of item entering and total taking mechanism comprising a totalizer actuator, a type carrier, a differentially movable member controlling the setting of the type carrier, means for causing the totalizer to be operated as a consecutive number counter coincidently with the setting of the type carrier for printing an item, means for operating said differentially movable member independently of the actuator in operations wherein said totalizer is operated as a counter and the type carrier set for item printing and for operating said differentially movable member in unison with said actuator in total printing and manipulative devices controlling said means.

45. In a machine of the class described, the combination with a totalizer, of a totalizer actuator, means for causing said totalizer to be operated as a consecutive number counter, a type carrier, a differentially movable member controlling the setting of the type carrier, means for operating the differentially movable member independently of the actuator in counting operations and through the actuator in other operations and manipulative devices controlling said means.

46. The combination of a plurality of type-carriers, a plurality of type on each carrier and movable thereby for bringing a type thereof into alignment with a type of another of said carriers, driving mechanism for driving the types so aligned to print on a record material, operating means for operating said type carriers to effect movement of one or more thereof away from normal position and back to normal position at each operation of the operating means and for operating said driving mechanism, and selecting means automatically operable at each of a plurality of operations of said operating means for determining which of said types shall be brought into alignment, whereby numbers may be automatically printed in arithmetical progression.

47. In a calculating machine, the combination of an item accumulating and printing mechanism, manipulative devices for determining the items to be accumulated, an item counting and item number printing mechanism automatically operable with said accumulating mechanism, and means whereby totals standing on both said mechanisms and resulting from accumulating and counting a plurality of items may be printed and clearing of both said mechanisms effected.

48. The combination of a plurality of segmental type-carriers having a uniform normal position, a plurality of type on each of said type-carriers and movable thereby for bringing a type thereof into alignment with a type of another of said type-carriers, driving mechanism for driving the types so aligned to print on a record material, selecting means automatically operable at each of a plurality of operations of said operating means for determining which of said types shall be brought into alignment, and operating means upon each actuation of which the type carriers are individually moved from said normal position to align the selected type at the printing point.

49. The combination of a plurality of segmental type-carriers having a uniform normal position, a plurality of type on each of said type-carriers, and movable thereby for bringing a type thereof into alignment with a type of another of said type-carriers, driving mechanism for driving the types so aligned to print on a record material, selecting means automatically operable at each of a plurality of operations of said operating means for determining which of said types shall be brought into alignment whereby numbers may be automatically printed in arithmetical progression, manipulative means for rendering said selecting means effective and ineffective, and operating means upon each actuation of which the type-carriers are individually moved from said normal position to align the selected type at the printing point.

50. In a calculating machine comprising an accumulator, an operating member operable for effecting operation of said accumulator and a carriage for carrying and spacing a record material and operable to locate the printing in a predetermined position thereon and movable in a direction other than at right angles to the printing line so as to continue the printing in another predetermined position thereon; in combination, a set of numeral types a plurality of which may be impressed by a single operation of said operating member so as to print numbers according to the registrations on said accumulator, a second set of types operable by said operating member and automatically controlled so as to record at each of a plurality of operations of said operating member the successive number of the item accumulated and printed at such operation.

51. In a calculating machine, the combination of a plurality of accumulators, printing mechanism for printing items accumulated on said accumulators, a second printing mechanism for printing items other than and in referential relation with the items printed by the first said printing mechanism, universal operating mechanism for operating said accumulators and both of said printing mechanisms, and mechanism for causing said second printing mechanism to print successive numbers at successive operations of said operating mechanism.

WILLIAM S. GUBELMANN.